US010615987B2

(12) United States Patent
Levy et al.

(10) Patent No.: US 10,615,987 B2
(45) Date of Patent: Apr. 7, 2020

(54) DIGITAL CERTIFICATE USAGE MONITORING SYSTEMS

(71) Applicant: Amazon Technologies, Inc., Seattle, WA (US)

(72) Inventors: Marcel Andrew Levy, Seattle, WA (US); Peter Zachary Bowen, Bainbridge Island, WA (US); Jonathan Kozolchyk, Seattle, WA (US); Nicholas Wexler, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/453,587

(22) Filed: Mar. 8, 2017

(65) Prior Publication Data
US 2018/0262347 A1    Sep. 13, 2018

(51) Int. Cl.
| | |
|---|---|
| *H04L 9/32* | (2006.01) |
| *H04L 9/14* | (2006.01) |
| *H04L 29/06* | (2006.01) |
| *H04W 12/08* | (2009.01) |

(52) U.S. Cl.
CPC .............. *H04L 9/3268* (2013.01); *H04L 9/14* (2013.01); *H04L 9/3247* (2013.01); *H04L 9/3263* (2013.01); *H04L 63/06* (2013.01); *H04L 63/0823* (2013.01); *H04W 12/0802* (2019.01)

(58) Field of Classification Search
CPC ... H04L 63/0823; H04L 63/06; H04L 9/3263; H04L 9/3268; H04L 9/14; H04L 9/3247; H04L 9/006; H04W 12/0802
See application file for complete search history.

(56) References Cited

U.S. PATENT DOCUMENTS

| | | |
|---|---|---|
| 5,872,849 A | 2/1999 | Sudia |
| 6,754,661 B1 | 6/2004 | Hallin et al. |
| 7,549,043 B2 * | 6/2009 | Adams ................ H04L 63/0442 709/206 |
| 7,650,493 B2 | 1/2010 | Narin |

(Continued)

FOREIGN PATENT DOCUMENTS

WO    WO 2016/163979 A1 * 10/2016    ............... H04L 9/32

OTHER PUBLICATIONS

A. Rojanapasakorn and C. Sathitwiriyawong, "A performance study of over-issuing delta-CRLs with distribution points," 18th International Conference on Advanced Information Networking and Applications, 2004. AINA 2004., Fukuoka, Japan, 2004, pp. 178-181 vol. 2. (Year: 2004).*

(Continued)

*Primary Examiner* — Kari L Schmidt
(74) *Attorney, Agent, or Firm* — Davis Wright Tremaine LLP

(57) ABSTRACT

A computer system associated with a certificate authority receives a request to obtain information that can be used to determine a validity status of a digital certificate. In response to the request, the computer system provides the information and updates usage information for the digital certificate to incorporate information obtained from the request. The usage information may be generated based at least in part on previous requests to obtain the information. Based at least in part on the usage information, the computer system will perform at least one operation associated with the digital certificate.

20 Claims, 12 Drawing Sheets

(56) References Cited

U.S. PATENT DOCUMENTS

| | | | |
|---|---|---|---|
| 7,814,315 | B2 | 10/2010 | Parkinson |
| 7,937,583 | B2 | 5/2011 | Thornton et al. |
| 8,195,934 | B1* | 6/2012 | Lawrence .......... H04L 63/0823 |
| | | | 713/156 |
| 8,549,300 | B1* | 10/2013 | Kumar ................ H04L 9/3247 |
| | | | 713/153 |
| 8,949,597 | B1 | 2/2015 | Reeves et al. |
| 9,083,696 | B1* | 7/2015 | Khaitan ............ H04L 63/0823 |
| 9,100,190 | B1* | 8/2015 | Schwengler .......... H04L 9/3263 |
| 9,215,075 | B1 | 12/2015 | Poltorak |
| 9,461,828 | B2* | 10/2016 | Engberg ............... H04L 9/3268 |
| 9,825,938 | B2* | 11/2017 | Koster ............... H04L 63/0823 |
| 9,882,727 | B1* | 1/2018 | Veladanda ............ H04L 9/3268 |
| 10,210,510 | B1 | 2/2019 | Brandwine |
| 10,257,161 | B2* | 4/2019 | L. ............................ H04L 63/20 |
| 10,439,826 | B2* | 10/2019 | Grajek ................. H04L 9/3252 |
| 10,454,690 | B1* | 10/2019 | Popoveniuc .......... H04L 9/3268 |
| 2002/0056747 | A1* | 5/2002 | Matsuyama ....... G07C 9/00039 |
| | | | 235/382 |
| 2002/0116647 | A1* | 8/2002 | Mont ..................... G06F 21/33 |
| | | | 726/6 |
| 2002/0184182 | A1* | 12/2002 | Kwan ............... G06Q 20/0855 |
| 2002/0194010 | A1 | 12/2002 | Bergler et al. |
| 2002/0194471 | A1* | 12/2002 | Benantar ............ H04L 63/0823 |
| | | | 713/158 |
| 2003/0014629 | A1* | 1/2003 | Zuccherato ........... H04L 9/3268 |
| | | | 713/156 |
| 2003/0084311 | A1 | 5/2003 | Merrien et al. |
| 2003/0126433 | A1* | 7/2003 | Hui ....................... H04L 9/3268 |
| | | | 713/158 |
| 2003/0200437 | A1* | 10/2003 | Oishi ................... H04L 9/3013 |
| | | | 713/175 |
| 2004/0177246 | A1 | 9/2004 | Balaz et al. |
| 2005/0069136 | A1* | 3/2005 | Thornton ............ H04L 63/0823 |
| | | | 380/277 |
| 2005/0071630 | A1 | 3/2005 | Thornton et al. |
| 2005/0076203 | A1 | 4/2005 | Thornton et al. |
| 2005/0114653 | A1* | 5/2005 | Sudia ................. H04L 63/0823 |
| | | | 713/158 |
| 2005/0289644 | A1* | 12/2005 | Wray ..................... G06F 21/41 |
| | | | 726/5 |
| 2006/0282664 | A1 | 12/2006 | Zhao |
| 2006/0294576 | A1 | 12/2006 | Cross et al. |
| 2008/0086633 | A1 | 4/2008 | Anderson et al. |
| 2008/0123855 | A1* | 5/2008 | Thomas .................. H04L 9/083 |
| | | | 380/277 |
| 2008/0253306 | A1 | 10/2008 | Manion et al. |
| 2008/0320569 | A1 | 12/2008 | Parkinson |
| 2009/0037894 | A1 | 2/2009 | Unger |
| 2009/0063855 | A1 | 3/2009 | Parkinson |
| 2009/0319783 | A1 | 12/2009 | Thornton et al. |
| 2010/0146250 | A1* | 6/2010 | Bergerson ............. H04L 9/3073 |
| | | | 713/1 |
| 2010/0268942 | A1* | 10/2010 | Hernandez-Ardieta ..................... H04L 9/006 |
| | | | 713/156 |
| 2011/0004763 | A1 | 1/2011 | Sato et al. |
| 2011/0087882 | A1* | 4/2011 | Kuo ........................ G06F 21/57 |
| | | | 713/156 |
| 2011/0113238 | A1* | 5/2011 | Jennings ............ H04L 63/0823 |
| | | | 713/156 |
| 2011/0126003 | A1* | 5/2011 | Engert ................ H04L 63/0823 |
| | | | 713/156 |
| 2011/0154017 | A1* | 6/2011 | Edstrom ............. H04L 63/0823 |
| | | | 713/151 |
| 2011/0154024 | A1* | 6/2011 | Ignaci ................ H04L 63/0823 |
| | | | 713/156 |
| 2011/0161663 | A1* | 6/2011 | Nakhjiri ............. H04L 63/0823 |
| | | | 713/158 |
| 2011/0202759 | A1* | 8/2011 | Hubbell ................ H04L 63/061 |
| | | | 713/156 |
| 2011/0213963 | A1 | 9/2011 | Wnuk |
| 2012/0036558 | A1 | 2/2012 | Maheshwari et al. |
| 2012/0054487 | A1* | 3/2012 | Sun ......................... G06F 21/64 |
| | | | 713/158 |
| 2013/0254535 | A1* | 9/2013 | Akehurst ................ H04L 29/06 |
| | | | 713/158 |
| 2014/0095866 | A1 | 4/2014 | Grebennikov et al. |
| 2016/0057132 | A1* | 2/2016 | Gibson ............... H04L 63/0823 |
| | | | 713/156 |
| 2016/0373263 | A1 | 12/2016 | Zaidi et al. |
| 2017/0026240 | A1* | 1/2017 | Purusothaman .... H04L 41/0853 |
| 2017/0033935 | A1* | 2/2017 | Clark .................... H04L 9/3268 |
| 2017/0104749 | A1 | 4/2017 | Koster |
| 2018/0062855 | A1 | 3/2018 | Bracken et al. |
| 2018/0097803 | A1 | 4/2018 | Iwanir et al. |
| 2018/0109390 | A1* | 4/2018 | Spratte ................. H04L 9/3268 |
| 2018/0123805 | A1* | 5/2018 | Veladanda ............ H04L 9/3268 |
| 2018/0139214 | A1* | 5/2018 | Anderson ............. H04L 63/145 |

OTHER PUBLICATIONS

Liu, Yabing, et al. "An end-to-end measurement of certificate revocation in the web's PKI." Proceedings of the 2015 Internet Measurement Conference. ACM, 2015. pp. 183-196. (Year: 2015).*

Ting Chen and Huiqun Yu, "The improved research on property-based remote attestation," 2010 International Conference on Computer Application and System Modeling (ICCASM 2010), Taiyuan, 2010, pp. V14-320-V14-324. (Year: 2010).*

Jong Hyuk Choi, Sang Seok Lim and K. D. Zeilenga, "A new on-line certificate validation method using LDAP component matching technology," Proceedings from the Sixth Annual IEEE SMC Information Assurance Workshop, West Point, NY, USA, 2005, pp. 280-285. (Year: 2005).*

Santesson et al., "TLS User Mapping Extension," Request for Comments: 4681, Standards Track, Oct. 2006, 11 pages.

Santesson, "TLS Handshake Message for Supplemental Data," Request for Comments: 4680, Standards Track, Sep. 2006, 9 pages.

Taylor et al., "Using the Secure Remote Password (SRP) Protocol for TLS Authentication," Request for Comments: 5054, Informational, Nov. 2007, 24 pages.

Tuexen et al., "Datagram Transport Layer Security (DTLS) for Stream Control Transmission Protocol (SCTP)," Request for Comments 6083, Jan. 2011, 10 pages.

Turner et al., "Prohibiting Secure Sockets Layer (SSL) Version 2.0," Request for Comments 6176, Mar. 2011, 4 pages.

Wikipedia, "Favicon," Wikipedia the Free Encyclopedia, last edited on Jun. 24, 2017, https://en.wikipedia.org/wiki/Favicon, 5 pages.

Wikipedia, "Online Certificate Status Protocol," Wikipedia the Free Encylodia, last edited May 24, 2017, https://en.wikipedia.org/wiki/Onfine_Certificate_Status_Protocol, 5 pages.

Atkinson, R., "IP Authentication Header," Request for Comments: 1826, Standards Track, Aug. 1995, 14 pages.

Atkinson, R., "IP Encapsulating Security Payload (ESP)," Request for Comments: 1827, Standards Track, Aug. 1995, 13 pages.

Atkinson, R., "Security Architecture for the Internet Protocol," Request for Comments: 1825, Standards Track, Aug. 1995, 23 pages.

Blake-Wilson et al., "Elliptic Curve Cryptography (ECC) Cipher Suites for Transport Layer Security (TLS)," Request for Comments: 4492, Informational, May 2006, 35 pages.

Blake-Wilson et al., "Transport Layer Security (TLS) Extensions," Request for Comments: 3546, Standards Track, Jun. 2003, 29 pages.

Blake-Wilson et al., "Transport Layer Security (TLS) Extensions," Request for Comments: 4366, Standards Track, Apr. 2006, 30 pages.

Blumenthal et al., "Pre-Shared Key (PSK) Ciphersuites with NULL Encryption for Transport Layer Security (TLS)," Request for Comments: 4785, Standards Track, Jan. 2007, 5 pages.

Brown et al., "Transport Layer Security (TLS) Authorization Extensions," Request for Comments: 5878, Experimental, May 2010, 19 pages.

Chown, "Advanced Encryption Standard (AES) Ciphersuites for Transport Layer Security (TLS)," Request for Comments: 3268, Standards Track, Jun. 2002, 7 pages.

(56) References Cited

OTHER PUBLICATIONS

Cooper et al., "Internet X.509 Public Key Infrastructure Certificate and Certificate Revocation List (CRL) Profile," Request for Comments: 5280, May 2008, 141 pages.
Cooper et al., "Internet X.509 Public Key Infrastructure: Certification Path Building," Request for Comments: 4158, Sep. 2005, 81 pages.
Dierks et al., "The TLS Protocol Version 1.0," Request for Comments 2246, Jan. 1999, 75 pages.
Dierks et al., "The Transport Layer Security (TLS) Protocol Version 1.2," Request for Comments 5246, Standards Track, Aug. 2008, 98 pages.
Eastlake, E., "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments 4279, Dec. 2005, 16 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Kanno et al., "Addition of the Camellia Cipher Suites to Transport Layer Security (TLS)," Request for Comments: 6367, Informational, Sep. 2011, 8 pages.
Karn, P., et al., "The ESP DES-CBC Transform," Request for Comments: 1829, Standards Track, Aug. 1995, 11 pages.
Kato et al., "Camellia Cipher Suites for TLS," Request for Comments: 5932, Standards Track, Jun. 2010, 6 pages.
Kent, "Privacy Enhancement for Internet Electronic Mail: Part II: Certificate-Based Key Management," Request for Comments: 1422, Feb. 1993, 32 pages.
Kent, S., "IP Encapsulating Security Payload (ESP)," Request for Comments: 4303, Standards Track, Dec. 2005, 45 pages.
Kent, S., "Security Architecture for the Internet Protocol," Request for Comments: 2401, Standards Track, Nov. 1998, 62 pages.
Kent, S., and K. Seo, "Security Architecture for the Internet Protocol," Request for Comments: 4301, Standards Track, Dec. 2005, 102 pages.
Khare et al., "Upgrading to TLS within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 9 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 8 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments 5764, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 10 pages.
Metzger, P., et al., "IP Authentication Using Keyed MD5," Request for Comments: 1828, Standards Track, Aug. 1995, 6 pages.
Moriai et al., "Addition of Camellia Cipher Suites to Transport Layer Security (TLS)," Request for Comments: 4132, Standards Track, Jul. 2005, 7 pages.
Newman, "Using TLS with IMAP, POP3 and ACAP," Request for Comments: 2595, Standards Track, Jun. 1999, 15 pages.
Orman, H., "The OAKLEY Key Determination Protocol," Request for Comments: 2412, Informational, Nov. 1998, 56 pages.
Phelan, "Datagram Transport Layer Security (DTLS) over the Datagram Congestion Control Protocol (DCCP)," Request for Comments 5238, May 2008, 11 pages.
Rescorla et al., "Datagram Transport Layer Security Version 1.2," Request for Comments 6347, Jan. 2012, 33 pages.
Rescorla et al., "Datagram Transport Layer Security," Request for Comments: 4347, Standards Track, Apr. 2006, 25 pages.
Rescorla et al., "Transport Layer Security (TLS) Renegotiation Indication Extension," Request for Comments: 5746, Standards Track, Feb. 2010, 15 pages.
Rescorla, "HTTP Over TLS," Request for Comments: 2818, Informational, May 2000, 7 pages.
Rescorla, "TLS Elliptic Curve Cipher Suites with SHA-256/384 and AES Galois Counter Mode (GCM)," Request for Comments: 5289, Informational, Aug. 2008, 6 pages.
Salowey et al., "Transport Layer Security (TLS) Session Resumption without Server-Side State," Request for Comments: 5077, Standards Track, Jan. 2008, 20 pages.
Salowey, "AES Galois Counter Mode (GCM) Cipher Suites for TLS," Request for Comments: 5288, Standards Track, Aug. 2008, 8 pages.
Salter et al., "Suite B Profile for Transport Layer Security (TLS)," Request for Comments: 6460, Informational, Jan. 2012, 14 pages.
U.S. Appl. No. 15/453,562, filed Mar. 8, 2017.
U.S. Appl. No. 15/453,604, filed Mar. 8, 2017.
International Search Report and Written Opinion dated May 17, 2018, International Patent Application No. PCT/US2018/021119, filed Mar. 6, 2018, 15 pages.
Azer et al., "Certification and Revocation Schemes in Ad Hoc Networks Survey and Challenges," 2007 Second International Conference on Systems and Networks Communications (ICSNC 2007), Aug. 25, 2007, 6 pages.
Duan et al., "Flexible Certificate Revocation List for Efficient Authentication in IoT," Proceedings of the 8th International Conference on the Internet of Things, Oct. 15, 2018, 8 pages.
Kouril et al. , "A Robust and Efficient Mechanism to Distribute Certificate Revocation Information Using the Grid Monitoring Architecture," 21st International Conference on Advanced Information Networking and Applications Workshops (AINAW'07), May 21, 2007, 6 pages.
Zheng, "Tradeoffs in Certificate Revocation Schemes," ACM SIGCOMM Computer Communication Review 33(2):103-112, Apr. 2003.

\* cited by examiner

DIGITAL CERTIFICATE USAGE MONITORING SYSTEMS

CROSS-REFERENCE TO RELATED APPLICATIONS

This application incorporates by reference for all purposes the full disclosure of co-pending U.S. patent application Ser. No. 15/453,562, filed Mar. 8, 2017, entitled "DIGITAL CERTIFICATE ISSUANCE AND MONTIORING."

BACKGROUND

Digital certificates, issued by a trusted certificate authority, are often used to enable the exchange of data securely over a communications network. For instance, a digital certificate may include a customer's public cryptographic key, which can be used for decryption of data provided by the customer and encrypted using the customer's private cryptographic key. The digital certificate may be signed by a certificate authority that the customer and the recipient of the digital certificate trust. However, it may be difficult for customers to track usage of digital certificates provided to their clients and issued by a trusted certificate authority.

BRIEF DESCRIPTION OF THE DRAWINGS

Various techniques will be described with reference to the drawings, in which.

DETAILED DESCRIPTION

Figure 1:
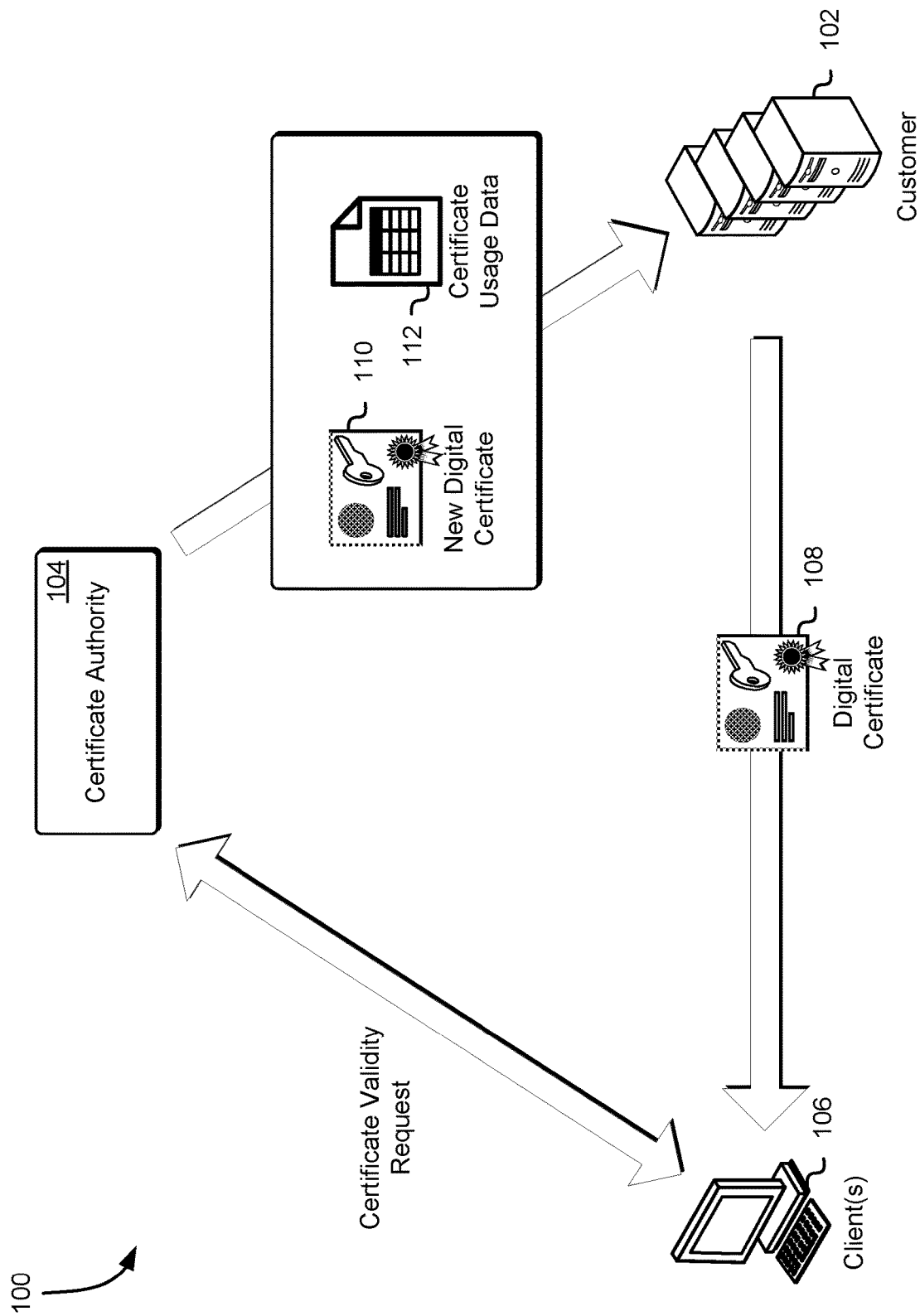
FIG. 1 shows an illustrative example of an environment in which various embodiments can be implemented.

This patent disclosure relates to the monitoring of digital certificates to determine usage characteristics for these digital certificates and performing operations based on these usage characteristics. In an example, a customer transmits a digital certificate signing request to a certificate authority to obtain a digital certificate that is digitally signed by the certificate authority and includes a public cryptographic key of the customer. The digital certificate signing request may include configuration information for monitoring the usage of the digital certificate that is to be issued by the certificate authority to the customer. For instance, through the configuration information, the customer may specify any preferences for presentation of usage data for the digital certificate and operations that may be performed by the certificate authority based on the usage data. Alternatively, if the digital certificate signing request does not include configuration information for monitoring usage of the digital certificate, the certificate authority may utilize default settings for determining what operations are to be performed based on the usage data obtained for the digital certificate. As an example, the certificate authority may use the usage data to determine whether to automatically renew an expiring digital certificate, to notify a customer of any abnormal usage of the digital certificate, to allow the digital certificate to expire without taking any further action, and the like.

In some examples, if the certificate authority furnishes a Certificate Revocation List (CRL) to enable these clients to determine whether a digital certificate issued by the certificate authority is valid, the certificate authority may generate a digital certificate that includes a Uniform Resource Identifier (URI) of a network endpoint that is specific to the digital certificate. For instance, in response to the digital certificate signing request from the customer, the certificate authority may select a network endpoint that is to be specific to the digital certificate. The certificate authority may specify, in the digital certificate, the URI for the selected network endpoint. This network endpoint may log any incoming requests to obtain the CRL and associate these incoming requests with its corresponding digital certificate in the form of usage data for the digital certificate. The network endpoint may provide this usage data to the certificate authority, which may process this usage data to determine if any operations are to be performed with regard to the digital certificate, including notifying the customer regarding usage of its digital certificate or issuing a new digital certificate if the digital certificate is set to expire. In some instances, the network endpoint may perform this determination and transmit a notification to the certificate authority to perform any operations.

In another example, if the certificate authority utilizes Online Certificate Status Protocol (OCSP) requests to provide the revocation status of a digital certificate, the certificate authority can track usage data for a particular digital certificate based on the digital certificate identifier specified in an OCSP request. The certificate authority may aggregate the usage data collected by the OCSP responders and determine if any operations are to be performed with regard to the digital certificate, such as the operations described above. The usage data may be aggregated according to a customer's preferences as specified in the digital certificate signing request such that the certificate authority may provide the usage data to the customer in a desired format or in a manner such that information requested by the customer is provided.

In this manner, a certificate authority may obtain usage data for a particular digital certificate and utilize this usage data to determine what operations may be performed for the digital certificate. In addition, the techniques described and suggested in this disclosure enable additional technical advantages. For instance, because the certificate authority obtains usage data from specific network endpoints and from OCSP responders, depending on the configuration of the certificate authority, digital certificates may be monitored to identify any usage patterns that can be used to determine whether to automatically renew a digital certificate and, if so, when to renew the digital certificate to minimize the potential impact for customers. For example, if a digital certificate is set to expire and the usage data indicates that the digital certificate is being used extensively, the certificate authority may automatically renew the digital certificate and provide the new digital certificate to the customer for distribution. Thus, client access to the customer's resources may be less likely to be affected.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a client 106 may transmit a request to a customer 102 of a computing service to establish a communications channel between the client 106 and the customer 102. The client 106 may submit an application layer (e.g., HyperText Transfer Protocol Secure (HTTPS), file transfer protocol, etc.) request to a destination server of the customer 102 (e.g., network server) to establish a secure network communications channel, such as a Transport Layer Security/Secure Sockets Layer (TLS/SSL) secure channel. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

The client 106 may be a computer system that may include one or more applications installed on the computer system configured to access and communicate with a service made available through a destination server of the customer 102. The client 106 may communicate with the customer 102 through one or more communications networks, such as the Internet. The application layer request from the client 106 may include an informational field, such as a user-agent field, which may be used by the customer 102 to determine the application purportedly utilized by the client to transmit the request. For instance, the user-agent field may specify a browser application (e.g., Internet Explorer®, Firefox®, Chrome®, etc.) used by the client 106 to communicate with the customer 102. Additionally, the client 106 may specify, for the secure network communications session to be established, negotiable features (e.g., cipher suites, etc.) that may be utilized by the customer 102 to communicate with the client 106 through the secure communications channel. While user-agents and cipher suites are used extensively throughout the present disclosure for the purpose of illustration, other information relating to the client 106 and the communications channel, including other attributes of the client and other features may be used.

The customer 102 may operate one or more web servers configured to provide web pages viewable through a browser application. Alternatively, the servers may be file servers that may be configured to enable clients to access one or more files remotely through the secure communications channel. Generally, these servers may include any server configured to establish a secure communications channel and implement various techniques described herein. In an embodiment, the customer 102 generates a digital certificate signing request to obtain a digital certificate 108 that may be presented to clients and other entities to enable authentication of the customer 102. The digital certificate signing request may specify a public cryptographic key for the customer 102, which may be part of a cryptographic key pair generated by the customer 102. The request may also include parameters that indicate parameters to be included in the digital certificate 108 such as a subject that corresponds to the customer 102 submitting the request and a validity period for the digital certificate 108. The customer 102 may transmit the digital certificate signing request to a certificate authority 104 that may be trusted by both the customer 102 and the client 106.

The customer 102 may provide, in its digital certificate signing request, configuration information that specifies one or more parameters for monitoring usage of the digital certificate 108 to be issued and operations to be performed based at least in part on the usage data 112 generated for the digital certificate 108. For instance, the customer 102 may specify that it is to be notified if usage of the digital certificate 108 surpasses a minimum threshold frequency within a period of time prior to expiration of the digital certificate 108. Additionally, or alternatively, the customer 102 may specify in the configuration information that the certificate authority 104 is to issue a new digital certificate 110 if the digital certificate 108 is utilized at a frequency that surpasses the minimum threshold frequency within the period of time prior to expiration of the digital certificate 108. In some instances, the customer 102 may specify that the certificate authority 104 is to allow the digital certificate 108 to expire if the usage data 112 indicates that the digital certificate 108 has not been utilized at a frequency that surpasses the minimum threshold frequency specified in the configuration information. In some embodiments, if the customer 102 does not provide configuration information for monitoring usage of the digital certificate 108, the certificate authority 104 may utilize default configuration settings for monitoring the digital certificate 108. For example, the certificate authority 104 may utilize the usage data 112 for the digital certificate 108 to determine whether to automatically renew the digital certificate 108, to allow the digital certificate 108 to expire, to transmit the usage data 112 to the customer 102, and the like.

In some embodiments, the certificate authority 104 maintains a CRL, which specifies identifiers for digital certificates that have been revoked. The certificate authority 104 may revoke a digital certificate if the certificate authority 104 determines that the private cryptographic key of the customer 102 has been compromised or the customer 102 has not complied with certain requirements set forth by the certificate authority 104 for maintaining the integrity of the cryptographic keys. For instance, if the customer 102 provides its private cryptographic key to other entities, the certificate authority 104 may revoke the digital certificate 108 that includes a public cryptographic key that corresponds to a cryptographic key pair of which the private cryptographic key is a part. In an embodiment, in response to the digital certificate signing request from the customer 102, the certificate authority 104 assigns a network endpoint to the identifier of the digital certificate 108 that is to be issued to the customer 102. For instance, in response to the digital certificate signing request, the certificate authority 104 may provision a network endpoint that is specific to the particular digital certificate 108 that is to be issued to the customer 102. Alternatively, the certificate authority 104 may select an existing network endpoint that has not been assigned to a particular digital certificate. The network endpoint may be a server that is configured to process incoming requests from clients to obtain a CRL maintained by the certificate authority 104. The network endpoint may also include one or more agents that may monitor incoming requests and record information about these requests in association with the digital certificate 108. The certificate authority 104 may specify, in the issuer field of the digital certificate 108, the network address for the network endpoint. The network address for the network endpoint may include a URI, an Internet Protocol (IP) address, an e-mail address, or any address that may be used to contact the network endpoint electronically.

In an alternative embodiment, the certificate authority 104 maintains one or more OCSP responders that are configured to process incoming OCSP requests for determining whether a digital certificate is valid. For instance, an OCSP request may specify a certificate serial number for a digital certificate, which the certificate authority, through an OCSP responder, may use to determine the revocation status of the digital certificate within a database maintained by the certificate authority. Based at least in part on the revocation status, the certificate authority 104 may transmit, via the OCSP responder, an OCSP response to the client 106 indicating the revocation status of the digital certificate. OCSP is described in RFC 6960, which is incorporated by reference. In response to a digital certificate signing request from the customer 102, the certificate authority 104 may update an existing database within a certificate monitoring data store to generate a new entry corresponding to the serial number of the digital certificate 108 that is to be issued to the customer 102. Thus, the certificate authority 104, via an OCSP responder, may monitor incoming OCSP requests to identify requests corresponding to the serial number of the digital certificate 108.

In response to the digital certificate signing request, the certificate authority 104 may issue the digital certificate 108 to the customer 102. As noted above, the digital certificate 108 may specify a network address for a specific network endpoint if the certificate authority 104 maintains a CRL for determining the validity of digital certificates issued by the certificate authority 104. However, if the certificate authority 104 maintains one or more OCSP responders for processing incoming OCSP requests from clients 106, the certificate authority 104 may specify, in the digital certificate 108, the network address of the certificate authority 104 or of any of the OCSP responders. The customer 102 may provide the digital certificate 108 to clients 106 and other entities to enable authentication of the customer 102.

A client receiving the digital certificate 108 from the customer 102 may evaluate the digital certificate 108 to identify the issuer of the digital certificate 108. To verify that the digital certificate 108 provided by the customer 102 is valid, the client 106 may transmit a request to the issuer specified in the digital certificate 108 to determine the revocation status of the digital certificate 108. In an embodiment, if the digital certificate 108 specifies a network address of a particular network endpoint specific to the digital certificate 108, the client 106 will transmit a request to that particular network endpoint to request a CRL for its use. In response to the request from the client 106, the network endpoint may obtain the CRL. For example, the network endpoint may locally store, in a cache, a CRL provided by the certificate authority 104. Alternatively, the network endpoint may transmit a request to the certificate authority 104 or other entity designated by the certificate authority 104 (e.g., a server, a data store, a logical data container, etc.) that may have the CRL available for use. Once the network endpoint has obtained the CRL, the network endpoint may transmit the CRL to the client 106 to fulfill the request. Additionally, the network endpoint may record information regarding the request as usage data corresponding to the digital certificate 108 to which the network endpoint is assigned. In some embodiments, the network endpoint tracks usage data for the digital certificate 108 using a histogram, whereby the network endpoint tracks the frequency at which the digital certificate 108 is used over the life (e.g., time from issuance to expiration) of the digital certificate 108. The network endpoint may provide the usage data for the digital certificate 108 to the certificate authority 104 periodically (e.g., after certain time intervals have passed) or in response to a triggering event (e.g., new CRL request is received, a particular milestone is reached for use of the digital certificate 108, the digital certificate 108 enters a particular period of time prior to expiration, etc.).

Alternatively, the client 106 may submit an OCSP to the certificate authority 104 or to an OCSP responder of the certificate authority 104 to determine whether the digital certificate 108 has been revoked. In response to an OCSP request, the certificate authority 104 or the OCSP responder may identify the serial number of the digital certificate 108, as specified in the OCSP request, and access a digital certificate database to determine if an entry corresponding to the provided serial number includes an indication that the digital certificate has been revoked. Based at least in part on the evaluation of the entry corresponding to the serial number of the digital certificate 108, the certificate authority 104 or the OCSP responder may transmit an OCSP response to the client 106. The OCSP response may specify whether the digital certificate 108 has been revoked or is still active for use. In an embodiment, the certificate authority 104 accesses a certificate monitoring data store to record usage information for the digital certificate 108 in response to the OCSP request. The certificate monitoring data store may include one or more databases corresponding to each digital certificate issued by the certificate authority 104. The certificate authority 104 may update the database corresponding to the digital certificate 108 to indicate usage of the digital certificate 108 in response to the OCSP request. Similar to the network endpoint described above, the certificate authority 104 may track usage data for the digital certificate 108 using a histogram.

The certificate authority 104 may aggregate the certificate usage data 112 obtained from the network endpoints or generated in response to OCSP requests based at least in part on one or more metrics. For instance, the certificate authority 104 may aggregate the certificate usage data 112 based at least in part on the browser applications utilized by the clients 106 to determine the validity of the digital certificate 108. Additionally, or alternatively, the certificate authority 104 may aggregate the certificate usage data 112 based at least in part on the geographic regions from which the requests originated from. While browser applications and geographic locations are used as examples of metrics that can be used to aggregate the certificate usage data 112, any metrics may be used, individually or in combination, to aggregate the certificate usage data 112.

In an embodiment, the certificate authority 104 evaluates the usage data for the digital certificate 108 in accordance with the customer's provided configuration information to determine if any operations are to be performed. For example, if the configuration information specifies that the certificate authority 104 is to issue a new digital certificate 110 to replace the digital certificate 108 if the digital certificate 108 is about to expire and the digital certificate 108 has been used with at a frequency greater than a minimum threshold frequency, the certificate authority 104 may issue the new digital certificate 110 to the customer 102 for distribution to clients 106. The configuration information may also specify that the certificate authority 104 is to provide the usage data 112 aggregated by the certificate authority 104 to the customer 102 or other entity designated by the customer 102. This may enable the customer 102 to evaluate the usage data 112 and determine whether to issue a new digital certificate signing request to obtain a new digital certificate for its use. In some embodiments, if the customer 102 has not provided configuration information to the certificate authority 104, the certificate authority 104 utilizes one or more heuristics to determine whether any operations are to be performed with regard to the digital certificate 108. For instance, at a time prior to expiration of the digital certificate 108, the certificate authority 104 may evaluate the usage data 112 for the digital certificate 108 to determine the frequency at which the digital certificate 108 was used within a particular time range up to the present time. If this frequency is greater than the minimum threshold frequency defined by the certificate authority 104, the certificate authority 104 may automatically issue a new digital certificate 110 to the customer 102 or otherwise transmit a notification to the customer 102 to indicate that the digital certificate 108 is set to expire and to present the option to obtain a new digital certificate 110. Alternatively, if the frequency is lower than the minimum threshold frequency, the certificate authority 104 may allow the digital certificate 108 to expire or may notify the customer 102 to indicate that the digital certificate 108 is not being used frequently enough to warrant renewal.

In some instances, the certificate authority 104 may weigh incoming CRL or OCSP requests differently based at least in part on the entity making the request. For example, while a request from a client 106 to obtain the CRL or to obtain an OCSP response may be counted as a single request for purposes of identifying the frequency at which the digital certificate 108 is utilized, a request originating from any of the customer's servers may be counted as multiple requests (e.g., hundreds, thousands, tens of thousands, etc.). The factors utilized for weighing requests may be specified in the configuration information provided by the customer 102 or may be selected by default by the certificate authority 104 if configuration information is not provided.

In an embodiment, the certificate authority 104 utilizes the certificate usage data 112 to determine whether one or more clients 106 have submitted requests to determine the validity of an expired or revoked digital certificate. For instance, if a client 106 has submitted a request to a particular network endpoint to obtain the CRL, the network endpoint (or another computing entity, such as a computer system scanning logs of the network endpoint) may analyze the CRL to determine whether the digital certificate that it is assigned to has expired or has otherwise been revoked. The network endpoint (or other entity) may provide the CRL to the client 106 and may specify, in the certificate usage data 112, that a request for determining the validity of an expired or revoked digital certificate was received. Similarly, if the client 106 submits an OCSP request to the certificate authority 104, the certificate authority 104 may use the OCSP response to determine whether an expired or revoked digital certificate is being utilized. This may also be recorded in the certificate usage data 112 maintained by the certificate authority 104.

If the certificate authority 104 evaluates the certificate usage data 112 and determines that requests are being received to determine the validity of an expired or revoked digital certificate, the certificate authority 104 may perform one or more operations. For instance, the certificate authority 104 may generate an alarm or other notification that is sent to the customer 102 to indicate that an expired or revoked digital certificate is being used by various clients 106. Alternatively, the certificate authority 104 may determine that the digital certificate or the customer 102 has been compromised and may revoke any digital certificates the customer 102 has obtained from the certificate authority 104. The certificate authority 104 may notify the customer 102 that these digital certificates have been revoked and that the customer 102 may not obtain new digital certificates until remedial actions are taken to cease use of the expired or revoked digital certificate by the clients 106.

Figure 2:
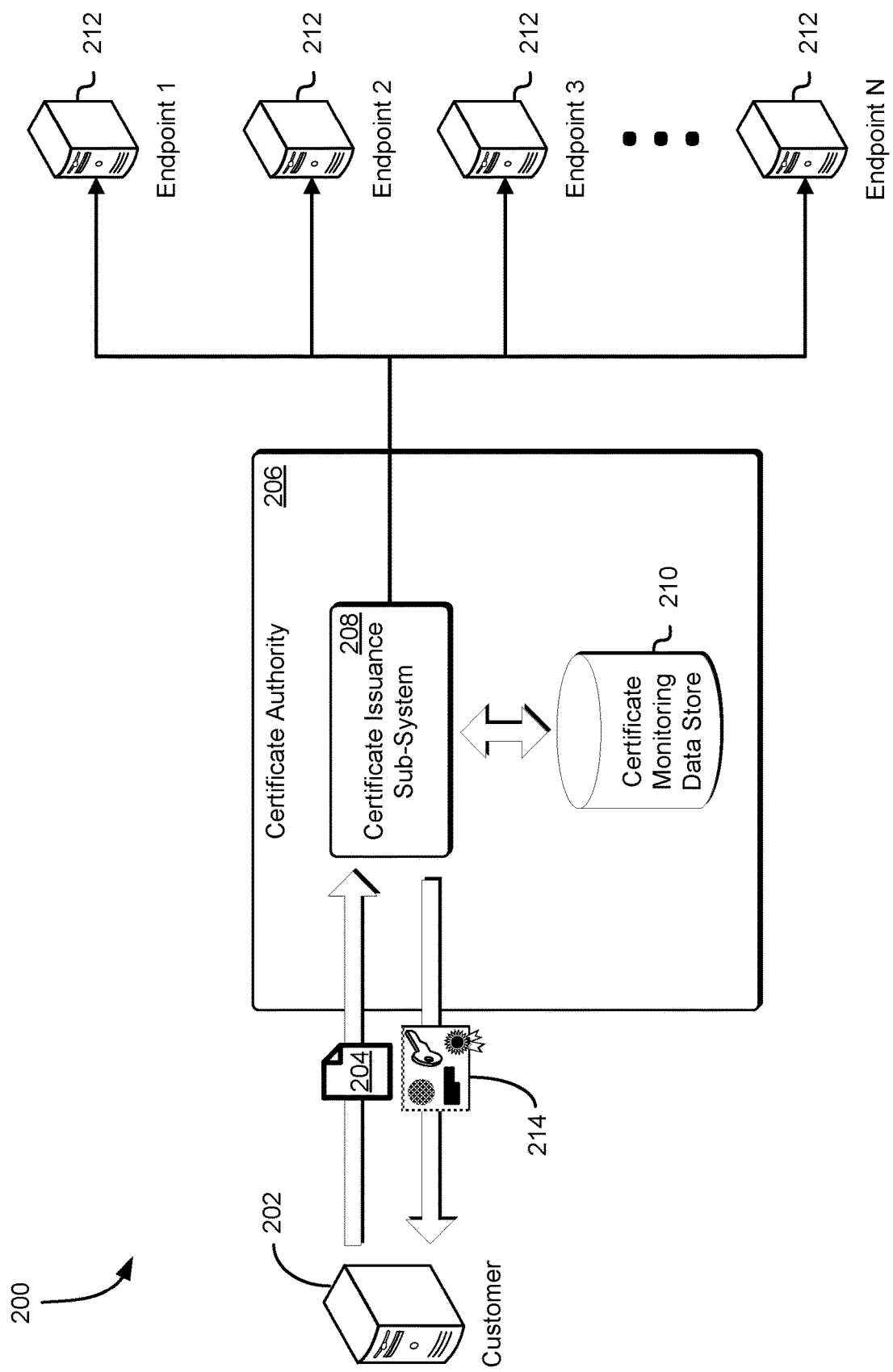
FIG. 2 shows an illustrative example of an environment in which a network endpoint is selected in response to a digital certificate signing request in accordance with at least one embodiment.

As noted above, in response to a digital certificate signing request from a customer, a certificate authority may select a network endpoint that is specific to the digital certificate that is to be issued to the customer. The network endpoint may provide a CRL in response to requests from clients to obtain the CRL and may track usage data corresponding to the digital certificate in response to these requests. Additionally, the network address of the selected network endpoint may be specified in the digital certificate such that requests from the clients to obtain the CRL are directed towards the selected network endpoint. Accordingly, FIG. 2 shows an illustrative example of an environment 200 in which a network endpoint 212 is selected in response to a digital certificate signing request in accordance with at least one embodiment.

In the environment 200, a customer 202 transmits a digital certificate signing request to a certificate issuance sub-system 208 of the certificate authority 206 to obtain a digital certificate 214 that can be used by clients to authenticate the customer 202. In the request, the customer 202 may provide configuration information 204, which may specify one or more customer preferences for monitoring usage of the digital certificate 214 and for operations to be performed based at least in part on the usage of the digital certificate 214. For example, the customer 202 may specify that if the digital certificate 214 is utilized at a greater frequency than a minimum threshold frequency defined by the customer 202, the certificate authority 206 is to issue a new digital certificate to the customer 202 at a time prior to expiration of the digital certificate 214. Additionally, or alternatively, the customer 202 may specify that the certificate authority 206 is to provide usage data for the digital certificate 214 periodically or in response to triggering events (e.g., a frequency threshold is reached, the digital certificate 214 has entered an expiration threshold period, etc.). It should be noted that the customer 202 may submit a digital certificate signing request without the configuration information 204. If so, the certificate authority 206, via the certificate issuance sub-system 208, may utilize one or more heuristics for tracking usage data for the digital certificate 214 and performing operations based at least in part on the usage data.

In response to the digital certificate signing request, the certificate issuance sub-system 208 may select a network endpoint 212 that is to be specific to the digital certificate 214 that is to be issued to the customer 202. The certificate issuance sub-system 208 may include one or more servers, computer systems, applications, or processes that process incoming digital certificate signing requests from customers and determines whether to issue the digital certificate in response to the request. Additionally, in some instances, the certificate issuance sub-system 208 may select a network endpoint 212 that is to be specific to the digital certificate 214 that is to be issued to the customer 202. For example, the certificate authority 206 may maintain a fleet of network endpoints 212, where each network endpoint 212 may be assigned to a particular digital certificate. Each network endpoint 212 may perform similar operations. For instance, a network endpoint 212 may process requests to obtain a CRL and furnish the CRL to clients in response to these requests. Additionally, a network endpoint 212 may collect and record usage information for its assigned digital certificate based at least in part on the requests to obtain the CRL. This usage information may be aggregated by the network endpoint 212 and provided to the certificate authority 206, which may store the usage information in a certificate monitoring data store 210. It should be noted that while CRLs are used extensively throughout the present disclosure for the purpose of illustration, other information that can be queried to determine the revocation status of a digital certificate may be requested and furnished to clients. For example, instead of a CRL, a network endpoint 212 may provide a Bloom filter or other probabilistic data structure that can be used to determine whether a particular digital certificate is a member of a set of digital certificates that have been revoked. Similarly, the network endpoint 212 may provide a database, which the client may query to determine whether the digital certificate is specified in the database as having been revoked.

The certificate issuance sub-system 208 may evaluate the fleet of network endpoints maintained by the certificate authority 206 to identify a network endpoint 212 that has not been assigned to a particular digital certificate. If a network endpoint 212 is available, the certificate issuance sub-system 208 may select the available network endpoint 212 and transmit one or more commands to the network endpoint 212 to assign the network endpoint 212 to the digital certificate 214 that is to be issued. The certificate issuance sub-system 208 may also obtain the network address of the selected network endpoint 212 and incorporate this network address in to the digital certificate 214 using the issuer field. If a network endpoint 212 is not available, the certificate issuance sub-system 208 may provision a new network endpoint 212 and select this new network endpoint 212. For instance, the certificate issuance sub-system 208 may transmit a request to a service provider that makes the network endpoints available to the certificate authority 206 to provision a new network endpoint 212. This may include loading a machine image onto a physical host and updating a Domain Name System (DNS) to resolve requests to a virtual machine instance instantiated with the machine image. Alternatively, the certificate issuance sub-system 208 may delay issuance of the digital certificate 214 until a network endpoint 212 becomes available (e.g., existing digital certificate expires, existing digital certificate is revoked, etc.). It should be noted that the fleet of network endpoints specific to respective digital certificates may lead to a single computer system. For instance, different URIs for these network endpoints may resolve to the same IP address of the single computer system. Alternatively, there may be a different software container or virtual machine for each network endpoint.

The certificate issuance sub-system 208 may access the certificate monitoring data store 210 to update a database for usage data to generate a new entry corresponding to the digital certificate 214. As the selected network endpoint 212 provides usage data for the digital certificate 214, the certificate issuance sub-system 208 may obtain the usage data from the network endpoint 212 and provide the usage data to the certificate monitoring data store 210, which may store the usage data in the database in association with an identifier for the digital certificate 214. The certificate monitoring data store 210 may include computer systems or storage devices of the certificate authority 206 that may store usage data for various digital certificates issued by the certificate authority 206. The certificate monitoring data store 210 may also aggregate the usage data according to a customer's preferences, as defined in the configuration information 204, or according to the configuration defined by the certificate authority 206. Thus, in response to the digital certificate signing request from the customer 202, the certificate monitoring data store 210 may store provided configuration information 204 in association with the identifier for the digital certificate 214.

The certificate issuance sub-system 208 may issue the digital certificate 214 to the customer 202 for distribution to clients seeking to authenticate the customer 202. Requests to obtain a CRL to verify the validity of the digital certificate 214 may be transmitted by these clients to the selected network endpoint 212, as specified in the digital certificate 214. Thus, the selected network endpoint 212 may provide the CRL to the clients while tracking usage of the digital certificate 214, as the network endpoint 212 is specific to the particular digital certificate 212.

Figure 3:
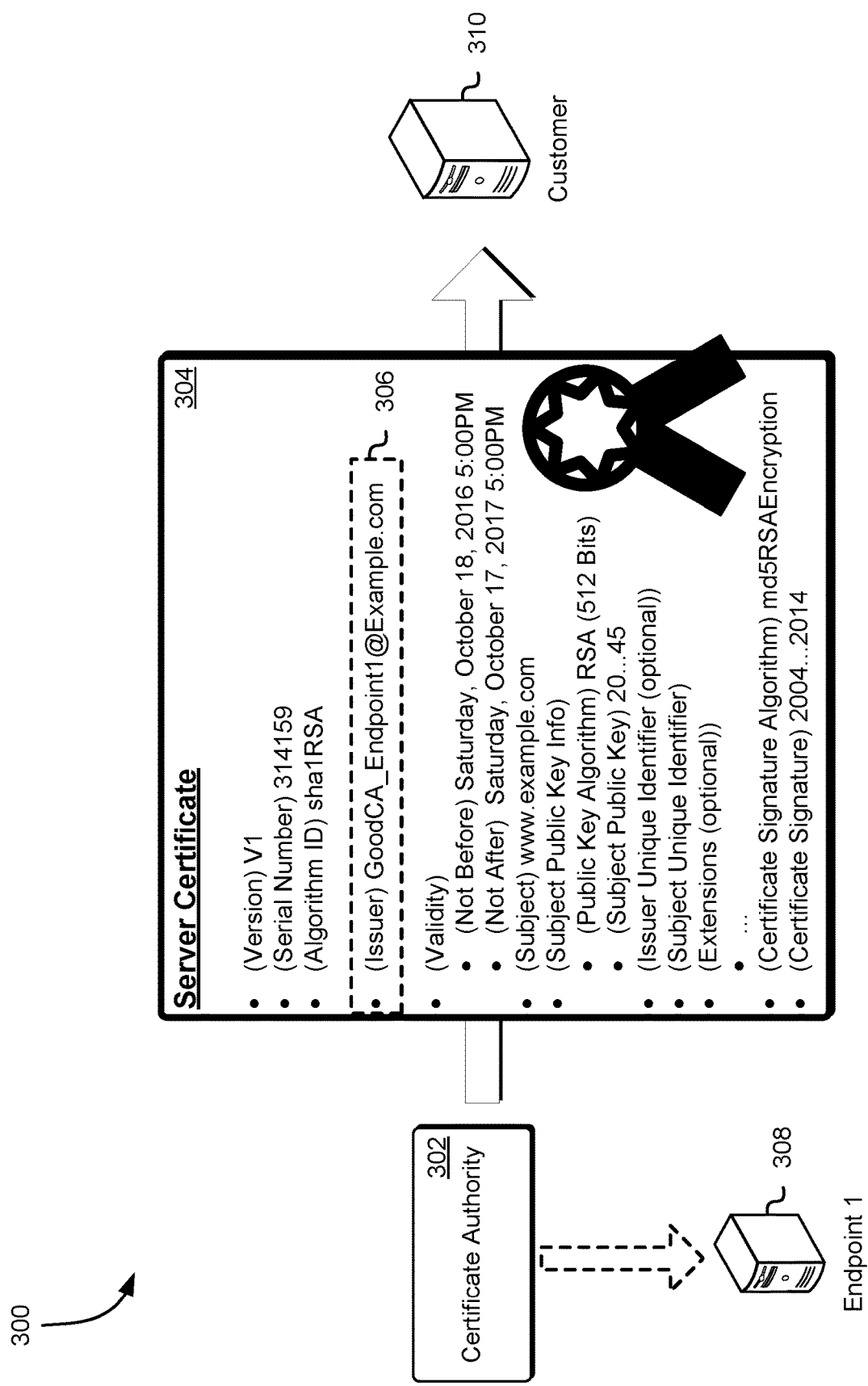
FIG. 3 shows an illustrative example of an environment in which a network address of a selected network endpoint is specified in a digital certificate for processing of requests to obtain a Certificate Revocation List and for monitoring usage of the digital certificate in accordance with at least one embodiment.

As noted above, a certificate authority may select a network endpoint to be specific to a digital certificate such that the network endpoint can track usage of the digital certificate based at least in part on requests from client to obtain a CRL. The digital certificate may specify the network address of the network endpoint such that requests to the issuer of the digital certificate to obtain the CRL are directed to the network endpoint. Accordingly, FIG. 3 shows an illustrative example of an environment 300 in which a network address of a selected network endpoint 308 is specified in a digital certificate 304 for processing of requests to obtain a CRL and for monitoring usage of the digital certificate 304 in accordance with at least one embodiment. In the environment 300, the certificate authority 302 issues a digital certificate 304 to a customer 310 in response to a digital certificate signing request from the customer 310. In response to the request, the certificate authority 302 may select a network endpoint 308 that is specific to the digital certificate 304 that is to be issued.

In an embodiment, the digital certificate 304 is an X.509 certificate, although other digital certificate encodings are also considered as being within the scope of the present disclosure. In this particular example, the digital certificate 304 includes various fields such as a version field, a serial number field, an algorithm identifier field, an issuer field 306, fields for validity periods, a subject field, fields about the public cryptographic key, issuer unique identifier fields, subject unique identifier fields, extension fields, certificate signature algorithm fields, and a certificate signature field. X.509 certificates are described in RFC 4158, RFC 5280, and RFC 1422, which are incorporated by reference.

The customer 310 may obtain the digital certificate 304 from the certificate authority 302 as fulfillment of a digital signature signing request generated by the customer 310 and provided to the certificate authority 302. The digital certificate signing request may include encrypted verification data and a public cryptographic key generated by the customer 310 as part of a cryptographic key pair generation process and that is to be used in the creation of the digital certificate 304. The certificate authority 302 may identify a validity period for the digital certificate 304 and specify this validity period using one or more fields of the digital certificate 304. If the certificate authority 302 successfully authenticates the customer 310, the certificate authority 302 may digitally sign the digital certificate 304 and provide the digital certificate 304 to the customer 310 to fulfill the digital certificate signing request.

In an embodiment, the certificate authority 302 specifies, using the issuer field 306, a network address for the selected network endpoint 308 that is specific to the digital certificate 304. Clients obtaining the digital certificate 304 from the customer 310 may evaluate the issuer field 306 of the digital certificate 304 to identify a network address that can be used to access the issuer of the digital certificate 304 and submit a request to obtain a CRL for determining the validity of the digital certificate 304. Thus, a client may access the network endpoint 308 to obtain the CRL. The network endpoint 308 may provide the CRL to the client and record information regarding the request in accordance with configuration information provided by the customer 310 for monitoring usage of the digital certificate 304. The network endpoint 308 may use this information to store usage data for the digital certificate 304.

Figure 4:
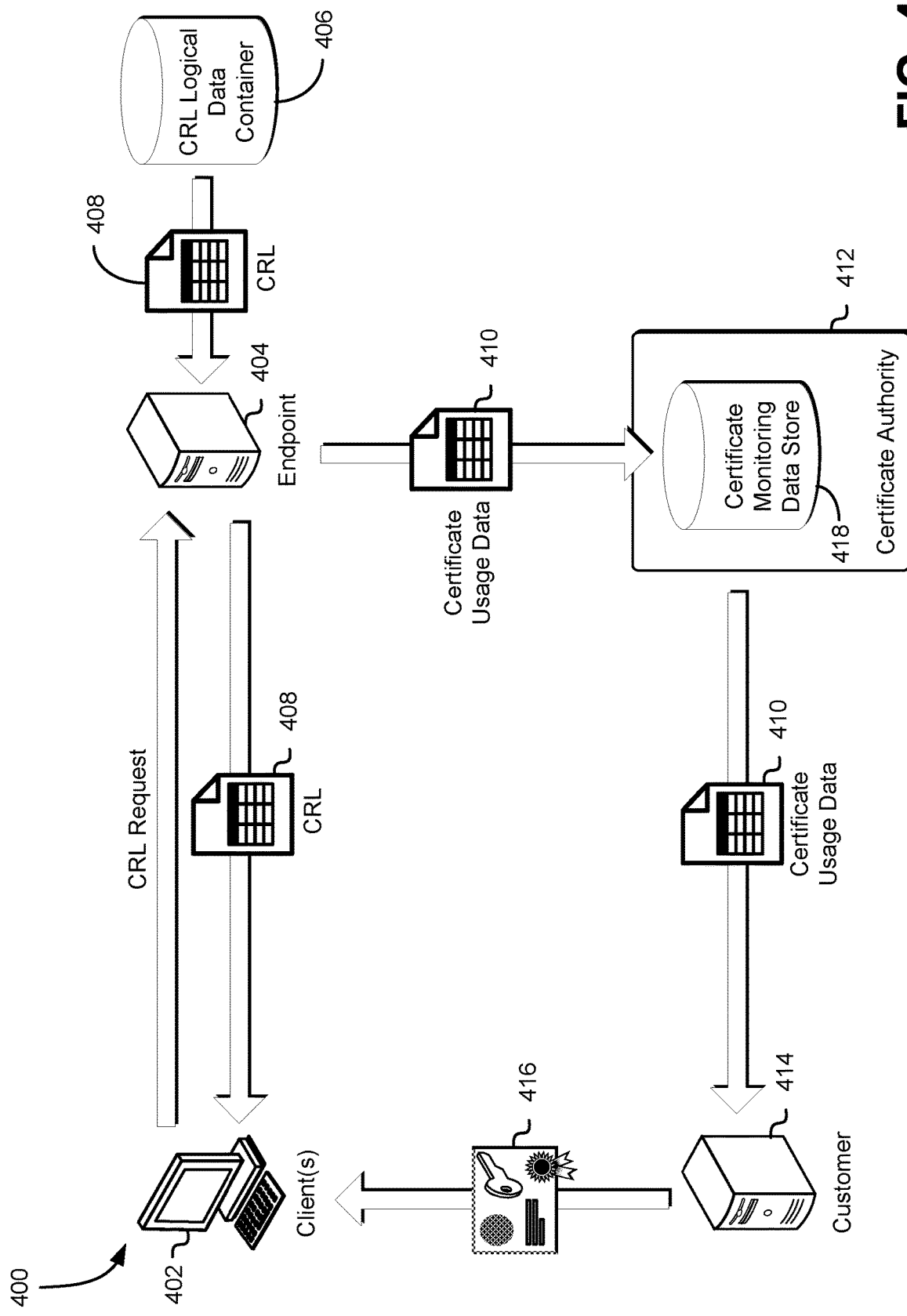
FIG. 4 shows an illustrative example of an environment in which a network endpoint processes requests for a Certificate Revocation List and provides data related to these requests to a certificate authority for delivery to a customer in accordance with at least one embodiment.

As noted above, in response to a digital certificate signing request from a customer, a certificate authority may select a network endpoint that is to be specific to the digital certificate and that is to provide a CRL in response to requests from clients. The network endpoint may record usage data for the digital certificate in response requests to obtain the CRL. This usage data may be provided to the certificate authority, which may evaluate the usage data to determine if any operations for the digital certificate are to be performed, including issuing new digital certificates and providing the usage data to the customer in a format specified by the customer in configuration information provided in the digital certificate signing request. Accordingly, FIG. 4 shows an illustrative example of an environment 400 in which a network endpoint 404 processes requests for a CRL 408 and provides data related to these requests to a certificate authority 412 for delivery to a customer 414 in accordance with at least one embodiment.

In the environment 400, a client 402 obtains a digital certificate 416 from a customer 414. For instance, the customer 414 may provide to the client 402 data encrypted using a private cryptographic key and the digital certificate 416, which may include a public cryptographic key that can be used to decrypt the data. Further, the digital certificate 416 may be used for authentication of the customer 414. For instance, the client 402 may evaluate the digital certificate 416 to determine if the digital certificate 416 specifies, as its subject, an identifier for the customer 414 or other trusted server operating on behalf of the customer 414. The trusted server may include the server to which the client submitted the request or other entity that may be associated with the customer 414 and that may have generated the cryptographic key pair on the customer's behalf. If the digital certificate 416 does not specify an identifier for a trusted server, the client 402 may determine that the digital certificate does not correspond to a trusted source and, as a result, may reject the digital certificate and the response from the customer 414.

If the digital certificate was issued to a trusted server, the client 402 may evaluate the digital certificate 416 to determine if the digital certificate 416 itself is valid and that the issuer of the certificate is a trusted certificate authority 412 (e.g., is a trusted certificate authority, or has a digital certificate that chains in a certificate chain to a trusted certificate authority). For example, the client may evaluate the digital certificate to determine whether it has expired. The digital certificate 416 may include a field that specifies an expiration date for the digital certificate 416. If the digital certificate 416 has expired, the client 402 may determine that the digital certificate 416 is not valid for use. Similarly, the digital certificate may include a field that specifies a "not before" date. If the digital certificate 416 specifies a "not before" date that is after the date at which the client 402 has received the digital certificate 416, the client 402 may determine that the digital certificate 416 cannot be used for authentication, as the digital certificate 416 has not become active for use.

In some embodiments, the digital certificate 416 specifies a network address for a network endpoint 404 that is specific to the digital certificate 416 and is configured to provide a CRL 408 in response to requests. The client 402 may use the network address of the network endpoint 404, as specified in the digital certificate 416, to transmit a request to the network endpoint 404 to obtain a CRL 408 to determine whether the digital certificate 416 is valid. In response to the request, the network endpoint 404 may access a CRL logical data container 406 which may maintain the CRL 408 on behalf of the certificate authority 412. It should be noted that the network endpoint 404 may maintain the CRL 408 in a cache, such that the network endpoint 404 may obviate the need to access the CRL logical data container 406 to obtain the CRL 408 in response to a request from a client 402. Additionally, while a CRL logical data container 406 is used throughout the present disclosure for the purpose of illustration, the CRL 408 may be maintained by the certificate authority 412 itself or through another entity on behalf of the certificate authority 412. The network endpoint 404 may provide the CRL 408 to the client 402 to fulfill the request.

The client 402 may evaluate the CRL 408 to determine if the obtained digital certificate 416 is specified in the CRL 408. If the digital certificate 416 is specified in the CRL 408, the client 402 may determine that the digital certificate 416 has been revoked and is no longer valid. The client 402 may also utilize the certificate authority's public cryptographic key to verify the digital signature specified in the digital certificate 416 originated from the certificate authority 412. If the client 402 is unable to verify this digital signature, the client 402 may determine that the digital certificate 416 is not valid. If the digital certificate 416 is determined to be invalid, the client 402 may reject the response. In some instances, the client 402 may evaluate the digital certificate 416 to determine whether it was issued by a certificate authority that it is configured to trust or that it otherwise trusts (e.g., because the certificate is in a certificate chain rooted in a trusted certificate authority). For example, if the client 402 is unable to recognize the issuer specified in the digital certificate or the digital certificate 416 was issued by a certificate authority that is not trusted by the client 402, the client 402 may reject the response.

In an embodiment, in response to the request from the client 402 to obtain the CRL 408, the network endpoint 404 may record information regarding the request as usage data 410 for the digital certificate 416. For instance, because the network endpoint 404 is configured to be specific to the digital certificate 416, any request to obtain the CRL 408 received by the network endpoint 404 may serve as an indication that the digital certificate 416 is being utilized. The usage data 410 may include the time at which the request was received, a network address of the entity that submitted the request, an indication as to whether the request was fulfilled, and the like. In some embodiments, the network endpoint 404 is provided with configuration information provided by the customer 414 regarding the format of the usage data 410. For instance, the configuration information may specify that usage data is to be collected for the digital certificate 416 within a particular period of time prior to expiration of the digital certificate 416. The configuration information may further specify that requests originating from a server of the customer 414, from a particular geographic region, or from a particular browser application is to be afforded greater weight than a request from a client 402. The network endpoint 404 may provide the usage data 410 to the certificate authority 412 periodically or in response to a triggering event, such as an expiration threshold being reached (e.g., a time prior to expiration of the digital certificate 416) or detection of unusual usage of the digital certificate 416 (e.g., unknown or malicious network addresses detected, etc.). The certificate authority 412 may store the obtained certificate usage data 410 within a certificate monitoring data store 418 for analysis and processing.

The certificate authority 412 may use the certificate usage data 410 from the network endpoint 404 to determine the operations to be performed. For instance, the certificate authority 412 may identify the customer's preferences for information regarding use of the digital certificate 416. For instance, the certificate authority 412 may evaluate the configuration information provided by the customer 414 to identify the customer's preferences. Alternatively, if the customer 414 has not provided its configuration information, the certificate authority 412 may utilize one or more heuristics to determine the operations to be performed based at least in part on the received usage data 410. For instance, if the usage data 410 indicates that the digital certificate 416 is being used at a frequency greater than a minimum frequency threshold, and the digital certificate 416 is close to expiring, the certificate authority 412 may issue a new digital certificate to the customer 414 or transmit a notification to the customer 414 to indicate that the digital certificate is about to expire. The certificate authority 412 may also provide the usage data 410 to the customer 414 for its use. This may enable the customer 414 to determine whether it would like to submit a new digital certificate signing request to obtain a new digital certificate to replace the expiring digital certificate. In some embodiments, if the certificate authority 412 determines, based at least in part on the usage data 410 provided by the network endpoint 404, that the digital certificate 416 is not be utilized or is underutilized, the certificate authority 412 will allow the digital certificate 416 to expire without performing any additional actions. In some instances, the certificate authority 412 may provide the usage data 410 with a notification indicating that renewing the digital certificate is not recommended.

Figure 5:
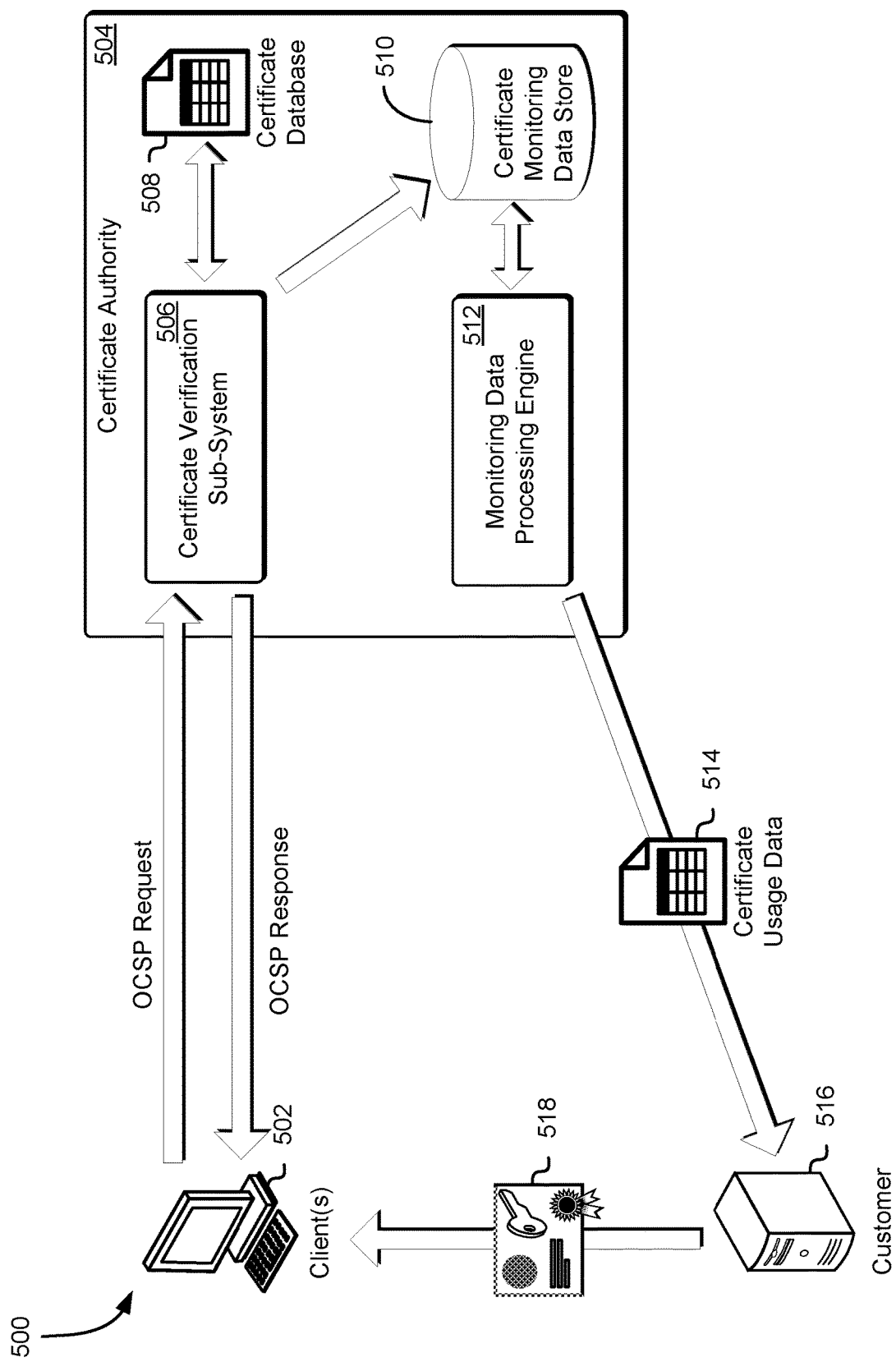
FIG. 5 shows an illustrative example of an environment in which a certificate authority processes Online Certificate Status Protocol requests and obtains usage data for digital certificates in accordance with at least one embodiment.

As noted above, a certificate authority may track usage of a digital certificate based at least in part on OCSP requests from clients to determine the validity of the digital certificate. The certificate authority may aggregate usage data for the digital certificate and determine whether to perform one or more operations in accordance with a customer's configuration information or with default settings of the certificate authority. This may include issuing a new digital certificate if the existing digital certificate is about to expire, transmitting notifications to the customer regarding usage of the digital certificate, allowing the digital certificate to expire, revoking the digital certificate, and the like. Accordingly, FIG. 5 shows an illustrative example of an environment 500 in which a certificate authority 504 processes OCSP requests and obtains usage data 514 for digital certificates 518 in accordance with at least one embodiment.

Similar to the environment 400 described above, in the environment 500, a client 502 obtains a digital certificate 518 from a customer 516, which the client 502 may use to authenticate the customer 516. To verify that the digital certificate 518 is valid for use, the client 502 may transmit an OCSP request to a certificate verification sub-system 506 of the certificate authority 504 to obtain a response that indicates the revocation status of the digital certificate 518. The OCSP request may specify the serial number or other identifier of the digital certificate 518, as specified in the digital certificate 518 itself. The certificate verification sub-system 506 may include one or more computer systems or applications of the certificate authority 504 that process incoming OCSP requests and generate an OCSP response based at least in part on the revocation status of a digital certificate. The certificate verification sub-system 506 may include OCSP responders provisioned by the certificate authority 504 to process incoming OCSP requests.

In response to an OCSP request from a client 502, the certificate verification sub-system 506 may query a certificate database 508 maintained by the certificate authority 504 to determine the revocation status of the digital certificate 518. For instance, the certificate verification sub-system 506 may use the supplied serial number or other identifier of the digital certificate 518 specified in the OCSP request to identify an entry within the certificate database 508 that corresponds to the digital certificate 518. The certificate verification sub-system 506 may generate an OCSP response that includes the revocation status of the digital certificate 518 as specified in the certificate database 508 and transmit the OCSP response to the client 502 to fulfill the request.

In an embodiment, the certificate verification sub-system 506 may record information regarding received OCSP requests for the revocation status of the digital certificate 518 as usage data 514 within the certificate monitoring data store 510. The usage data may denote the traffic received by the certificate verification sub-system 506 in obtaining the revocation status for the digital certificate 518. As described above, the certificate monitoring data store 510 may store the usage data in a database in association with an identifier for the digital certificate 518. The certificate monitoring data store 510 may include computer systems or storage devices of the certificate authority 504 that may store usage data for various digital certificates issued by the certificate authority 504. The certificate monitoring data store 510 may also aggregate the usage data according to a customer's preferences, as defined in the configuration information, or according to the configuration defined by the certificate authority 504. A monitoring data processing engine 512 of the certificate authority 504 may access the certificate monitoring data store 510 to obtain the aggregated usage data and determine, based at least in part on the usage data, whether to perform one or more operations with regard to the digital certificate 518. The monitoring data processing engine 512 may include computer systems, applications, or processes performed using computer systems of the certificate authority 504 for evaluating usage data for a digital certificate and for performing operations with regard to the digital certificate based at least in part on the usage data.

The monitoring data processing engine 512 may determine if the customer 516 to which the digital certificate 518 was issued has provided configuration information specifying its preferences for receiving usage data 514 for the digital certificate 518 and any preferred operations to be performed based at least in part on the usage data 514. For instance, the monitoring data processing engine 512 may transmit the usage data 514 to the customer 516 in a format specified in the configuration information and under one or more conditions as specified in the configuration information. These conditions may include, but are not limited to, surpassing a usage frequency threshold, a time prior to expiration of the digital certificate 518 has been reached, a malicious client using the digital certificate 518 has been detected, and the like. In some instances, there may be no configuration information available from the customer 516. If the customer 516 has not provided configuration information, the monitoring data processing engine 512 may utilize one or more heuristics for processing the usage data 514. For example, the monitoring data processing engine 512 may transmit the usage data 514 to the customer 516 if the frequency at which the digital certificate 518 is utilized surpasses a minimum frequency threshold defined by the certificate authority 504. Similarly, if the digital certificate 518 is set to expire, the monitoring data processing engine 512 may cause the certificate authority 504 to issue a new digital certificate to the customer 516 if the frequency at which the digital certificate 518 is utilized surpasses a minimum frequency threshold defined by the certificate authority 504. However, if the frequency at which the digital certificate 518 is utilized does not surpass a minimum frequency threshold, the monitoring data processing engine 512 may allow the digital certificate 518 to expire without issuing a new digital certificate.

Figure 6:
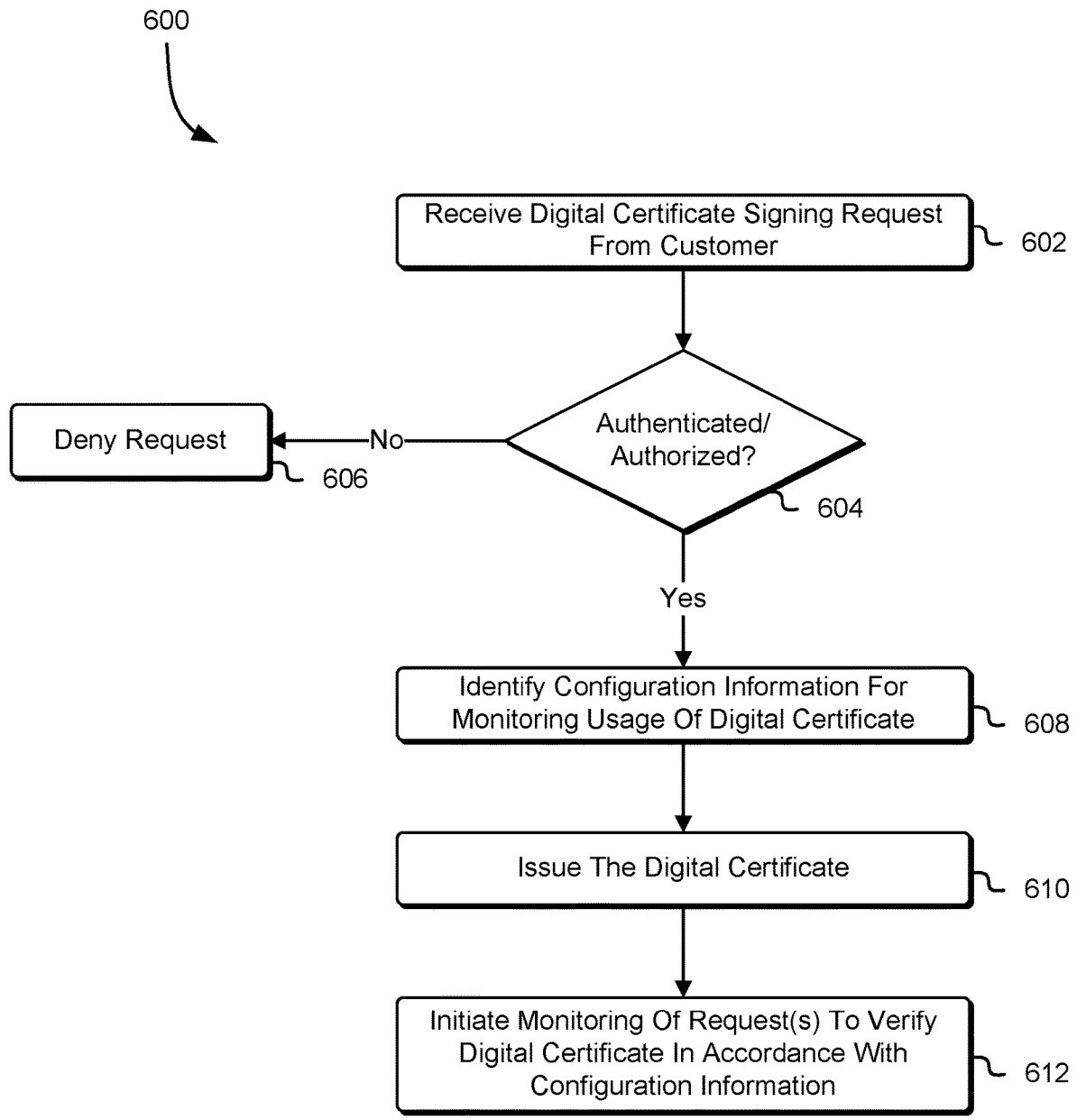
FIG. 6 shows an illustrative example of a process for monitoring usage of a digital certificate in response to a digital certificate signing request in accordance with at least one embodiment.

As noted above, a customer may submit a digital certificate signing request to a certificate authority to obtain a digital certificate that can be used by clients to authenticate the customer. The request may include configuration information for monitoring usage of the digital certificate, which the certificate authority may use to determine what operations are to be performed based at least in part on the usage of the digital certificate by various clients and the customer itself. Accordingly, FIG. 6 shows an illustrative example of a process 600 for monitoring usage of a digital certificate in response to a digital certificate signing request in accordance with at least one embodiment. The process 600 may be performed by the aforementioned certificate authority, which may issue a new digital certificate to the customer and monitor usage of the digital certificate in accordance with a customer's configuration information provided in its request or in accordance with the heuristics of the certificate authority.

The digital certificate signing request may be generated by the customer at any time. For instance, the customer may generate a digital certificate signing request in response to a request from a client to obtain data from the customer. This may enable the customer to provision a digital certificate for each request received from a client to obtain certain data. The digital certificate signing request may be generated by the customer upon receiving the request from the client or after generating the data that is to be transmitted to the client. Alternatively, the customer may generate the digital certificate signing request independent of any request obtained from a client. Thus, the client may utilize the same digital certificate for various client requests instead of generating a new digital certificate for each incoming request from a client. The certificate authority may, thus, receive 602 a digital certificate signing request from the customer.

In response to the request, the certificate authority may determine 604 whether the request can be authenticated and, if so, whether the customer is authorized to obtain the digital certificate. For instance, the certificate authority may transmit credential information included in the request to an authentication service. The authentication service may evaluate the provided information to determine whether the customer can be authenticated. For example, the authentication service may access a user profile for the customer to obtain information that can be used to verify the provided information. If the authentication service determines that the information provided is valid and corresponds to the customer, the authentication service may authenticate the customer and transmit a notification to the certificate authority to indicate that the customer has been successfully authenticated. If the customer cannot be authenticated or is not authorized to obtain the digital certificate, the certificate authority may deny 606 the request. This may include transmitting a notification to the customer to indicate that the request has been denied.

If the certificate authority determines that the request is authentic and that the customer is authorized to obtain the digital certificate, the certificate authority may identify 608 configuration information for monitoring usage of the digital certificate. For instance, the certificate authority may determine whether the customer has provided configuration information that specifies the customer's preferences for monitoring the digital certificate, providing usage data for the digital certificate, and performing operations in response to one or more conditions being met regarding usage of the digital certificate. If the customer has not provided configuration information in its request, the certificate authority may rely on its own configuration information for monitoring of the digital certificate, which may include one or more default operations that may be performed in monitoring of the digital certificate. Once the certificate authority has identified the configuration information that is to be used, it may issue 610 the digital certificate to the customer.

The certificate authority may initiate 612 monitoring of incoming requests to verify the validity of the digital certificate in accordance with the identified configuration information. For instance, in response to an OCSP request, the certificate authority may record information regarding the request in a database using a format specified in the configuration information. Further, the certificate authority may use the recorded information to generate usage data for the digital certificate and perform one or more operations based at least in part on the usage data and in accordance with the configuration information provided by the customer or utilized by the certificate authority by default.

Figure 7:
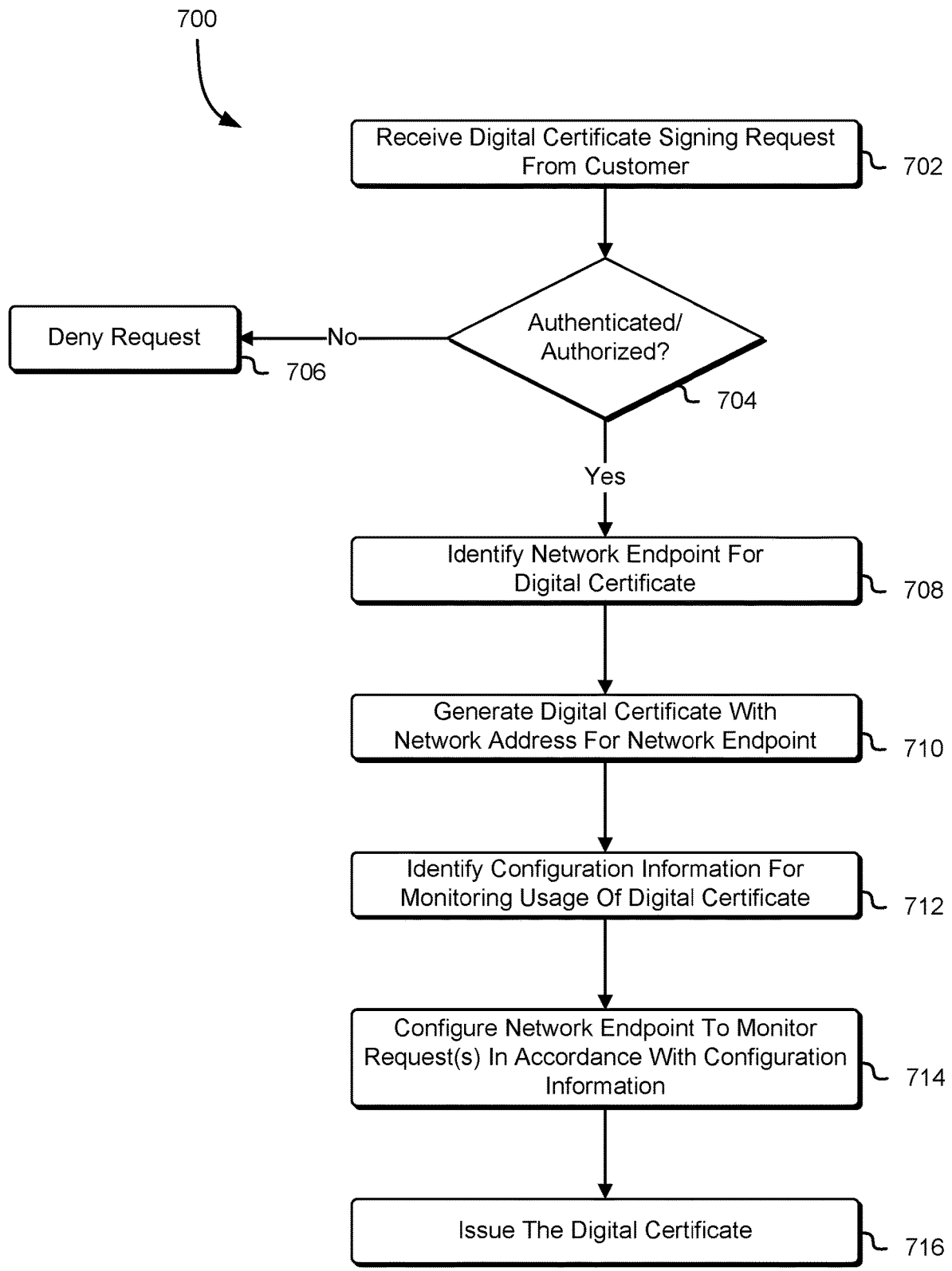
FIG. 7 shows an illustrative example of a process for issuing a digital certificate having a network address of a network endpoint for monitoring usage of the digital certificate in response to Certificate Revocation List requests in accordance with at least one embodiment.

As noted above, a certificate authority may select, in response to a digital certificate signing request, a network endpoint that is to be specific to the digital certificate and used to process incoming requests to obtain a CRL that can be used to determine the revocation status of the digital certificate. In some embodiments, the certificate authority will provision a network endpoint that is to be specific to the digital certificate and record the network address of the network endpoint in the digital certificate as corresponding to the issuer of the digital certificate. Thus, a request to obtain the CRL may be directed to the network endpoint, which may provide the CRL in response to the request and record information regarding usage of the digital certificate according to configuration information either provided by the customer or as defined by the certificate authority by default. Accordingly, FIG. 7 shows an illustrative example of a process 700 for issuing a digital certificate having a network address of a network endpoint for monitoring usage of the digital certificate in response to CRL requests in accordance with at least one embodiment. The process 700 may be performed by the aforementioned certificate authority, which may issue digital certificates to customers and maintain network endpoints that can be assigned to specific digital certificates for monitoring usage of these digital certificates and providing the CRL in response to requests.

Similar to the process 600 described above, the certificate authority may receive 702 a digital certificate signing request from the customer, determine 704 whether the request can be authenticated and, if so, whether the customer is authorized to obtain the digital certificate. If the customer cannot be authenticated or is not authorized to have a digital certificate issued to it, the certificate authority may deny 706 the request. If the customer is authorized to obtain a digital certificate in response to its digital certificate signing request, the certificate authority may identify 708 a network endpoint that is to be specific to the digital certificate. For instance, the certificate authority may evaluate a database specifying key-value pairs corresponding to network endpoints maintained by the certificate authority and identifiers of digital certificates that may be assigned to these network endpoints. From this database, the certificate authority may determine whether there are any network endpoints that have not been assigned to monitor usage of a digital certificate. If the certificate authority identifies one or more network endpoints that have not been assigned to monitor a digital certificate, the certificate authority may select one of these network endpoints and associate the network endpoint with the digital certificate that is to be issued to the customer. However, if there are no network endpoints available, the certificate authority may wait until a digital certificate expires or is revoked, resulting in a network endpoint being unassigned to a digital certificate. Alternatively, the certificate authority may provision a new network endpoint, which then may be tasked to monitor usage of the digital certificate. The certificate authority may update the database to associate the network endpoint with an identifier for the digital certificate.

Once the certificate authority has identified the network endpoint that is to be specific to the digital certificate, the certificate authority may generate 710 the digital certificate with the network address for the network endpoint. The certificate authority may specify the network address of the network endpoint in the issuer field of the digital certificate such that any CRL requests from a user of the digital certificate may be directed to the network endpoint. The network address may include a URI of the network endpoint, an IP address of the network endpoint, an e-mail address of the network endpoint, and the like. In addition to generating the digital certificate, the certificate authority may identify 712 configuration information for monitoring usage of the digital certificate. For instance, the certificate authority may determine whether the customer has provided configuration information that specifies the customer's preferences for monitoring the digital certificate, providing usage data for the digital certificate, and performing operations in response to one or more conditions being met regarding usage of the digital certificate. Alternatively, if the customer has not provided configuration information in its request, the certificate authority may rely on its own configuration information for monitoring of the digital certificate.

Once the certificate authority has identified the configuration information that is to be used, it may configure 714 the network endpoint to monitor incoming requests to obtain the CRL in accordance with the identified configuration information. For instance, in response to a request to obtain the CRL, the network endpoint may record information regarding the request in a database using a format specified in the configuration information. Further, the network endpoint may transmit the recorded information to the certificate authority to cause the certificate authority to generate usage data for the digital certificate and perform one or more operations based at least in part on the usage data and in accordance with the configuration information provided by the customer or utilized by the certificate authority by default. In some instances, the certificate authority may configure the network endpoint to generate the usage data in accordance with the configuration information itself and to provide the usage data to the certificate authority for further processing. The certificate authority may issue 716 the digital certificate to the customer once the network endpoint has been configured to monitor incoming requests to obtain the CRL in accordance with the configuration information.

Figure 8:
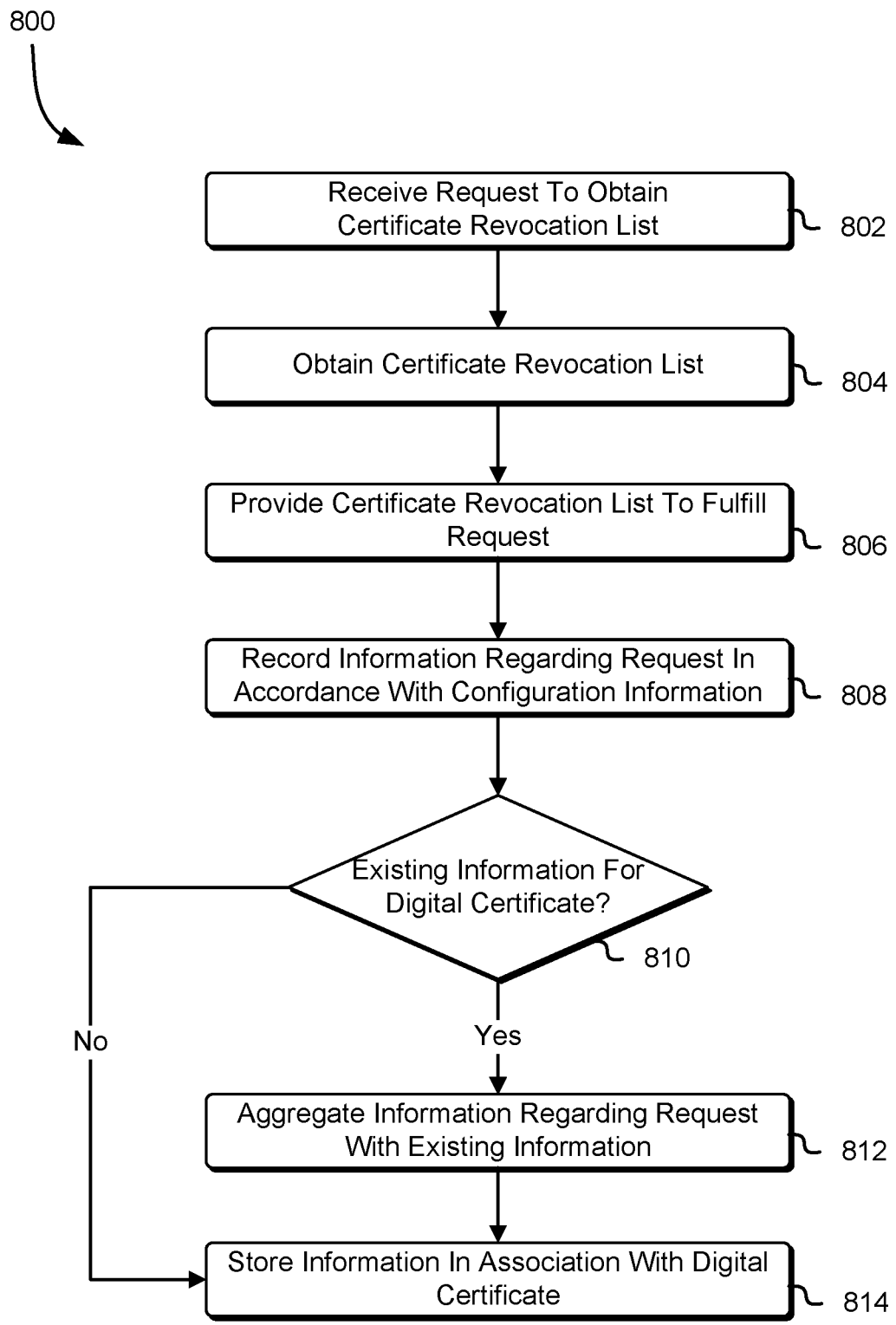
FIG. 8 shows an illustrative example of a process for recording usage information for a digital certificate in response to a request to obtain a Certificate Revocation List in accordance with at least one embodiment.

As noted above, a network endpoint specific to a particular digital certificate may process incoming requests to obtain a CRL and record information regarding the request in accordance with configuration information provided by the customer to whom the digital certificate was issued or by the certificate authority. This information regarding the request may be stored by the network endpoint in a location accessible by the certificate authority. Alternatively, the network endpoint may generate usage data based at least in part on this recorded information and provide the usage data to the certificate authority. Accordingly, FIG. 8 shows an illustrative example of a process 800 for recording usage information for a digital certificate in response to a request to obtain a CRL in accordance with at least one embodiment. The process 800 may be performed by any network endpoint that is specific to a particular digital certificate and is configured to record information regarding requests to obtain the CRL in accordance with the configuration information and in association with the digital certificate.

At any time, the network endpoint may receive 802 a request from a client or from a customer to obtain a CRL. As described above, the CRL may specify one or more identifiers for digital certificates that have been revoked by the certificate authority. The certificate authority may revoke a digital certificate if the certificate authority determines that the private cryptographic key of the customer has been compromised or the customer has not complied with certain requirements set forth by the certificate authority for maintaining the integrity of the cryptographic keys. For instance, if the customer provides its private cryptographic key to other entities, the certificate authority may revoke the digital certificate that includes a public cryptographic key that corresponds to a cryptographic key pair of which the private cryptographic key is a part. Thus, a requestor may submit a request to obtain the CRL to determine the revocation status of a digital certificate. If an identifier of the digital certificate is specified in the CRL, the requestor may determine that the digital certificate has been revoked. Alternatively, if the identifier of the digital certificate is not specified in the CRL, the requestor may determine that the digital certificate is still valid for use.

In response to the request, the network endpoint may obtain 804 the CRL. For instance, the network endpoint may maintain the CRL in cache or on a storage device of the network endpoint for retrieval in response to requests. Alternatively, the network endpoint may access a CRL logical data container maintained by the certificate authority to obtain the CRL. The network endpoint may transmit a request to the certificate authority itself to obtain the CRL. Once the network endpoint has obtained the CRL, the network endpoint may provide 806 the CRL to the requestor to fulfill the request. The requestor may utilize the CRL to determine whether the digital certificate is valid or has been revoked by the certificate authority.

In addition to providing the CRL to the requestor, the network endpoint may record 808 information regarding the received request in accordance with the configuration information provided by either the customer or the certificate authority. As noted above, the network endpoint may be specific to a particular digital certificate. For example, the digital certificate may specify a network address of the network endpoint. Since the network endpoint is specific to the digital certificate, any request to obtain the CRL received by the network endpoint may indicate usage of the digital certificate, as the requestor may be trying to determine whether the digital certificate is valid for use in authenticating the customer to whom the digital certificate was issued. The network endpoint may evaluate the configuration information from the customer or the certificate authority to determine the format to be used for recording the information regarding the request (e.g., file format, histogram, etc.) and may record the information according to this format.

The network endpoint may determine 810 whether there is existing information for the digital certificate available. For instance, the network endpoint may access a local (relative to the network endpoint) repository to identify information previously collected by the network endpoint for the digital certificate. If the network endpoint identifies existing information for the digital certificate, the network endpoint may aggregate 812 the information regarding the request recorded in response to the request with the existing information in accordance with the configuration information. This may include updating a histogram detailing usage of the digital certificate to incorporate the newly recorded information or otherwise appending the existing information to include the newly recorded information. The network endpoint may store 814 the information in association with the digital certificate in the local repository. Alternatively, the network endpoint may transmit the information to the certificate authority for further processing.

Figure 9:
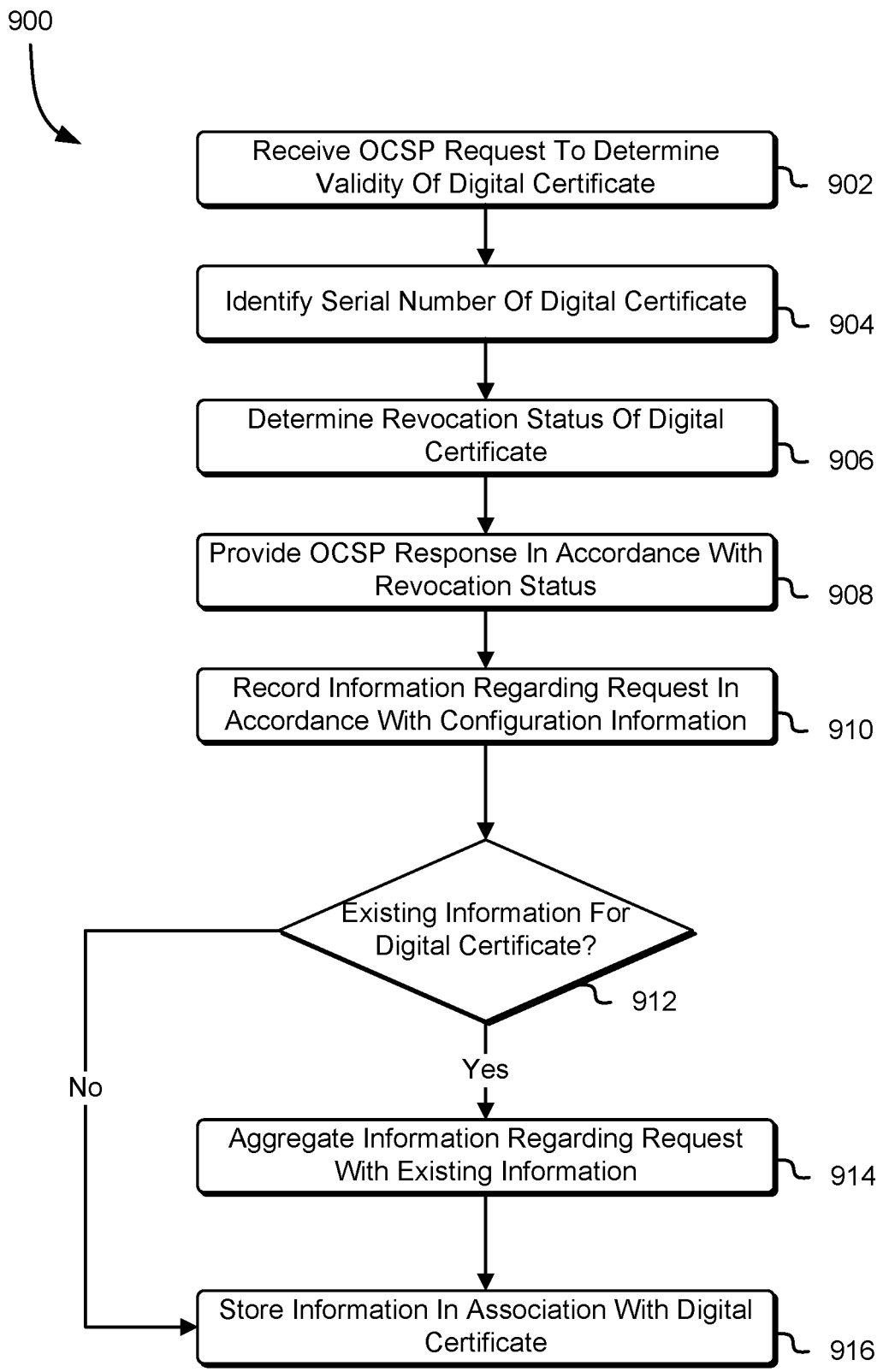
FIG. 9 shows an illustrative example of a process for recording usage information for a digital certificate in response to Online Certificate Status Protocol requests in accordance with at least one embodiment.

As noted above, a certificate authority, via an OCSP responder, may process incoming OCSP requests to determine the revocation status of a digital certificate. In response to the request, the certificate authority may query a digital certificate database to identify an entry corresponding to the digital certificate and determine if the digital certificate has been revoked or is still valid for use. The certificate authority may generate an OCSP response that specifies whether the digital certificate has been revoked or is valid for use. Further, the certificate authority may record information regarding the request in accordance with configuration information provided by the customer or used by the certificate authority by default. Accordingly, FIG. 9 shows an illustrative example of a process 900 for recording usage information for a digital certificate in response to OCSP requests in accordance with at least one embodiment. The process 900 may be performed by the certificate authority or an OCSP responder operating on behalf of the certificate authority.

At any time, a client, customer, or other entity may submit an OCSP request to the certificate authority to determine the revocation status of a particular digital certificate. The OCSP request may specify the serial number or other identifier of the digital certificate issued to the customer by the certificate authority. The certificate authority, via an OCSP responder, may receive 902 the OCSP request from the requestor to determine the validity (e.g., revocation status) of the digital certificate. Further, the certificate authority may evaluate the received OCSP request to identify 904 the serial number or other identifier of the digital certificate. Using the serial number or other identifier of the digital certificate, the certificate authority may query a digital certificate database to identify an entry corresponding to the digital certificate. The digital certificate database may specify the revocation status for each digital certificate issued by the certificate authority. Thus, if the certificate authority is not able to identify an entry corresponding to the provided serial number or identifier, the digital certificate may not have been issued by the digital certificate and, thus, the certificate authority may be unable to determine whether it is valid. If the database includes an entry corresponding serial number or other identifier of the digital certificate, the certificate authority may determine 906 the revocation status of the digital certificate.

The certificate authority, via the OCSP responder, may generate an OCSP response that specifies the revocation status for the digital certificate and may provide 908 the response to the requestor to fulfill the request. Additionally, the certificate authority may record 910 information regarding the OCSP request in accordance with configuration information provided by the customer or used by the certificate authority by default if the customer has not provided its configuration information. The certificate authority may evaluate the configuration information from the customer or used by default by the certificate authority to determine the format to be used for recording the information regarding the request (e.g., file format, histogram, etc.) and may record the information according to this format.

The certificate authority may determine 912 whether there is existing information for the digital certificate available. For instance, the certificate authority may access the certificate monitoring data store described above in connection with FIG. 5 to identify information previously collected by the certificate authority for the digital certificate in response to other OCSP requests. If the certificate authority identifies existing information for the digital certificate, the certificate authority may aggregate 914 the information regarding the request recorded in response to the request with the existing information in accordance with the configuration information. This may include updating a histogram detailing usage of the digital certificate to incorporate the newly recorded information or otherwise appending the existing information to include the newly recorded information. The certificate authority may store 916 the information in association with the digital certificate in the certificate monitoring data store.

Figure 10:
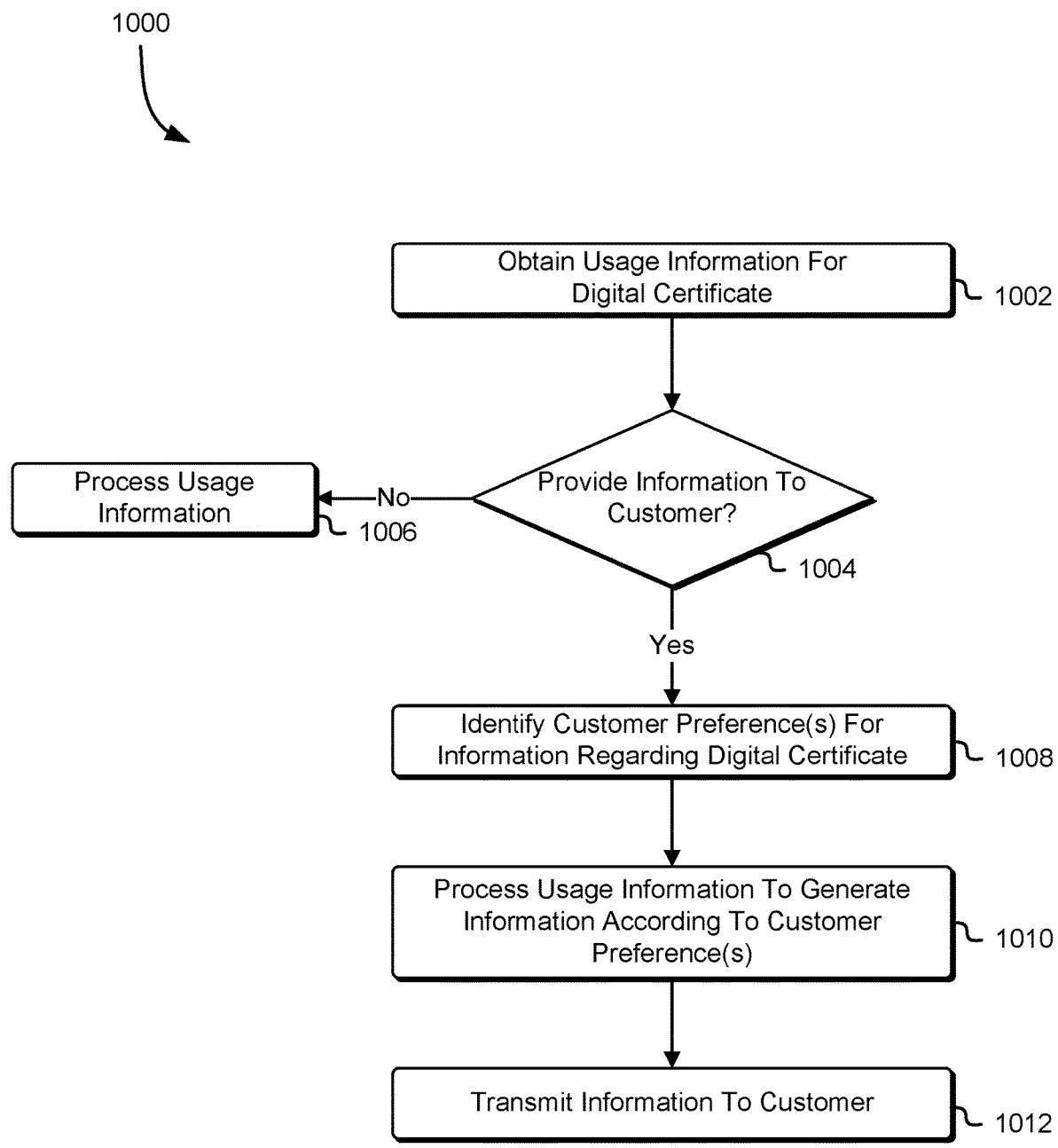
FIG. 10 shows an illustrative example of a process for processing usage information for a digital certificate to generate information in accordance with customer preferences in accordance with at least one embodiment.

As noted above, the certificate authority may obtain usage data for a particular digital certificate and process the usage data in accordance with a customer's preferences or using one or more heuristics if the customer has not provided configuration information for processing the usage data. For instance, the certificate authority may process the usage data to generate metrics representing usage of the digital certificate over time and to prepare one or more recommendations for renewal of the digital certificate based at least in part on the usage of the digital certificate. The certificate authority may provide the usage data and any other information generated via processing of this usage data to the customer or other entity designated by the customer. Accordingly, FIG. 10 shows an illustrative example of a process 1000 for processing usage information for a digital certificate to generate information in accordance with customer preferences in accordance with at least one embodiment. The process 1000 may be performed by the certificate authority, which may utilize configuration information from the customer to process usage data from a network endpoint or from OCSP responders to generate the information that can be provided to the customer.

The certificate authority may obtain 1002 the usage information for a digital certificate in response to a triggering event or after a period of time has passed since issuance of the digital certificate. For instance, the certificate authority may obtain the usage information for a digital certificate if it detects that the digital certificate is set to expire within a pre-determined period of time or as specified in the configuration information provided by the customer. Alternatively, the certificate authority may obtain the usage information periodically to identify any patterns in usage of the digital certificate. The certificate authority may transmit a request to the network endpoint that has stored the usage information to obtain the usage information. Similarly, if the certificate authority utilizes OCSP to process requests for the revocation status of a digital certificate, the certificate authority may access the certificate monitoring data store to obtain usage information for the digital certificate.

Once the certificate authority has obtained the usage information for the digital certificate, the certificate authority may determine 1004 whether the usage information is to be provided to the customer. For instance, the certificate authority may utilize the certificate usage information for its own purposes, including analyzing the certificate usage information to determine whether to allow the digital certificate to expire or whether the digital certificate has been compromised. If the certificate authority determines that the usage information will not be provided to the customer, the certificate authority may process 1006 the certificate usage information and store the certificate usage information within the certificate monitoring data store, as described above.

If the certificate authority determines that the certificate usage information is to be provided to the customer, the certificate authority may identify 1008 the one or more customer preferences for information regarding usage of the digital certificate. The certificate authority may access the certificate monitoring data store to obtain the one or more customer preferences provided by the customer in its digital certificate signing request. These customer preferences may indicate a format in which the usage information is to be presented to the customer. Additionally, the one or more customer preferences may specify operations that the certificate authority is to perform based at least in part on the usage information. For instance, the one or more customer preferences may include notifying the customer if the usage information indicates a high frequency of usage of the digital certificate a period of time prior to expiration of the digital certificate. It should be noted that in some instances there may be no customer preferences for information regarding the digital certificate. If there are no customer preferences for this information, the certificate authority may rely on one or more default settings for presenting the usage information to the customer or performing operations based at least in part on the usage information, such as creating a histogram illustrate usage of the digital certificate over the validity period of the digital certificate.

Based at least in part on the customer's preferences or on the default settings established by the certificate authority, the certificate authority may process 1010 the usage information to generate information according to these preferences or settings. For instance, if the customer has specified that it would prefer to obtain usage information for a digital certificate in the form of a histogram that illustrates the frequency at which a digital certificate is used throughout the validity period of the digital certificate, the certificate authority may use the usage information to generate the histogram according to the customer's specifications. Alternatively, if the customer has specified that it wants a recommendation as to whether it should seek to renew the digital certificate based at least in part on the frequency of usage of the digital certificate, the certificate authority may evaluate the usage information to determine whether the digital certificate has been used at a frequency greater than a minimum threshold frequency as defined by the customer or, if not provided by the customer, by the certificate authority. The certificate authority may generate the recommendation based at least in part on its analysis of the usage information.

The certificate authority may transmit 1012 the information generated via processing of the usage information to the customer or other entity designated by the customer in its configuration information. In some embodiments, based at least in part on the usage information obtained for the digital certificate, the certificate authority will perform additional or alternative operations. For instance, if the certificate authority determines, based at least in part on the usage information for the digital certificate, that the digital certificate is being used extensively throughout the validity period of the digital certificate, the certificate authority may issue a new digital certificate to the customer at a time prior to expiration of the existing digital certificate. Alternatively, if the certificate authority determines that the digital certificate has not been used or the frequency of usage is below a minimum threshold frequency, the certificate authority may allow the digital certificate to expire without issuing a new digital certificate. The certificate authority may inform the customer that the digital certificate has expired and provide the information to indicate why the digital certificate was allowed to expire. The digital certificate may instead allow the digital certificate expire without notifying the customer.

Figure 11:
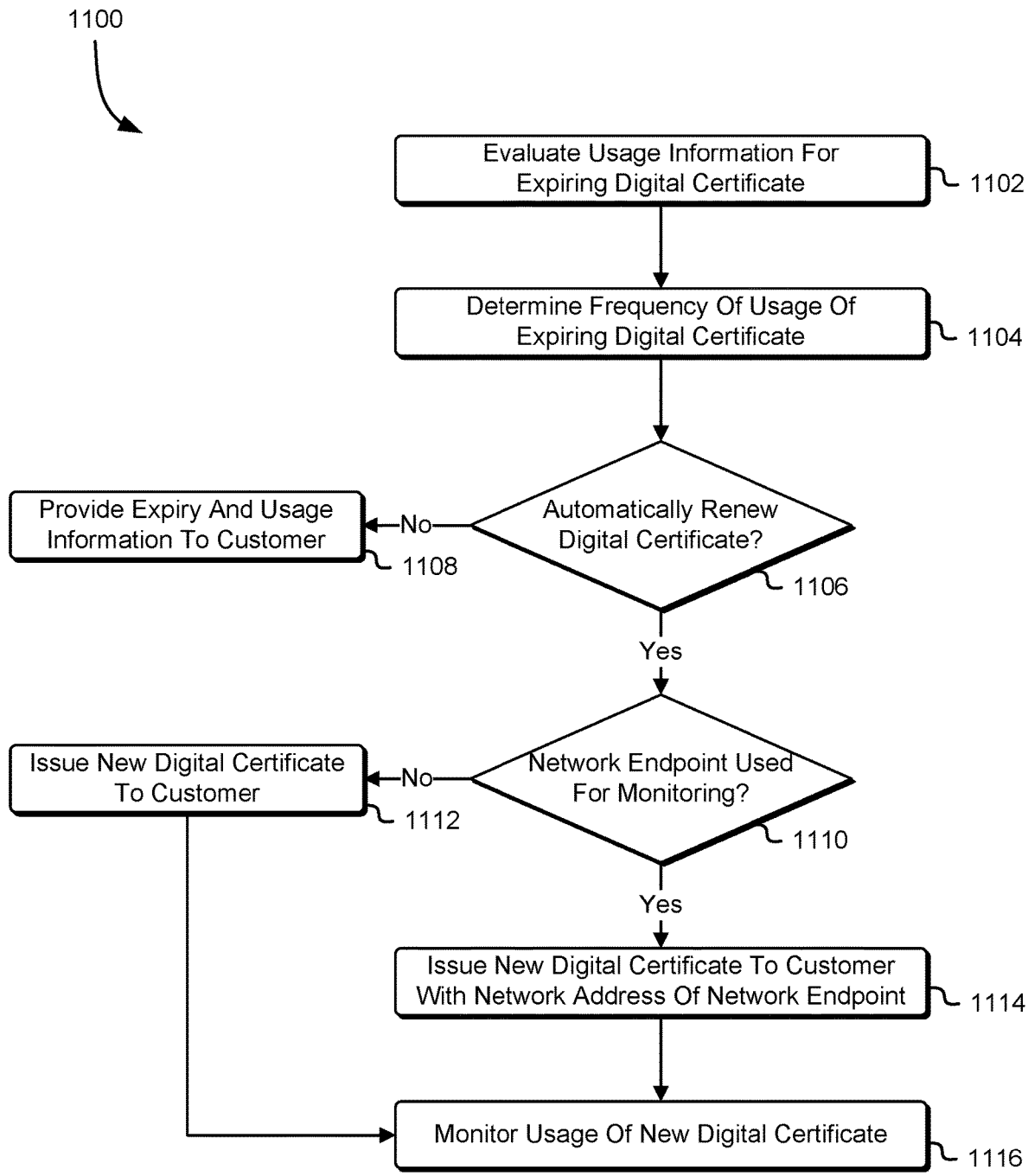
FIG. 11 shows an illustrative example of a process for utilizing usage information for a digital certificate to determine renewal process for an expiring digital certificate in accordance with at least one embodiment.

As noted above, a certificate authority may evaluate usage information for a digital certificate to determine whether to automatically renew the digital certificate at a time prior to expiration of the digital certificate. For instance, if the digital certificate is used extensively at a time prior to expiration as defined by the customer or by the certificate authority, the certificate authority may determine that the digital certificate is useful to the customer and its clients and may renew the digital certificate. Alternatively, if the digital certificate is not being used frequently enough to warrant renewal, the certificate authority may allow the digital certificate expire and transmit a notification to the customer to indicate that the digital certificate has expired. Accordingly, FIG. 11 shows an illustrative example of a process 1100 for utilizing usage information for a digital certificate to determine renewal process for an expiring digital certificate in accordance with at least one embodiment. The process 1100 may be performed by the certificate authority, which may process usage information to determine whether to renew a digital certificate. Further, the process 1100 may be performed by a certificate authority that utilizes OCSP or provides, via network endpoints, a CRL to clients and customers.

At a time prior to expiration of a digital certificate (e.g., a week prior to expiration, a month prior to expiration, etc.), a certificate authority may obtain usage information for the digital certificate from the corresponding network endpoint or from the certificate monitoring data store. The certificate authority may identify an expiring digital certificate by evaluating a digital certificate database that specifies the validity period for each digital certificate issued by the certificate authority. Once the certificate authority has identified an expiring digital certificate and has obtained usage information for the expiring digital certificate, the certificate authority may evaluate 1102 the usage information for the expiring digital certificate to determine 1104 the frequency of usage of the expiring digital certificate. For instance, the certificate authority may construct, using the usage information for the expiring digital certificate, a histogram that illustrates the frequency at which the digital certificate was used over the validity period for the digital certificate. In some embodiments, the certificate authority will evaluate the usage information to identify the origin of each request received to determine the revocation status of the digital certificate or to obtain the CRL. Based at least in part on where a request originated from, the certificate authority may weigh the request differently. For example, if a request originated from a customer to whom the digital certificate was issued or other entity designed by the customer as acting on its behalf (e.g., a server from a fleet of servers managed by the customer), the certificate authority may weigh the request as comprising multiple individual requests (e.g., hundred, thousand, ten thousand, hundred thousand, etc.) compared to requests from clients and other entities. Thus, in determining the frequency of usage, requests from the customer may be weighed more heavily, leading to a higher frequency.

Based at least in part on the frequency of usage of the expiring digital certificate, the certificate authority may determine 1106 whether to automatically renew the digital certificate. For instance, the customer may have provided configuration information in its digital certificate signing request that specifies a minimum threshold frequency the digital certificate is to be used in order for the certificate authority to renew the digital certificate as it is about to expire. Alternatively, if the customer has not provided configuration information, the certificate authority may use one or more default settings to determine whether to automatically renew the digital certificate. These default settings may include a minimum threshold frequency for usage of the digital certificate that serves as an indication as to whether the digital certificate is to be automatically renewed. Further, these default settings may specify that this minimum threshold frequency is to be surpassed within a period of time prior to expiration of the digital certificate in order to trigger automatic renewal of the digital certificate.

If the certificate authority determines that the digital certificate will not be automatically renewed, the certificate authority may provide 1108 expiry information and the usage information to the customer. For instance, the certificate authority may transmit a notification to the customer to inform it that the digital certificate is set to expire. Further, the certificate authority may provide the usage information to enable the customer to evaluate usage of the digital certificate over to time and determine whether it would like to renew the digital certificate. In some embodiments, the certificate authority will allow the digital certificate to expire without providing the usage information or the notification about the expiration of the digital certificate to the customer. For instance, if the digital certificate has not been used leading up to expiration of the digital certificate or the frequency at which it is used is below the minimum threshold frequency, the certificate authority may allow the digital certificate to expire without any notifications to the customer.

If the certificate authority determines that the digital certificate is to be automatically renewed, the certificate authority may determine 1110 whether a network endpoint is being used for monitoring of the expiring digital certificate. As described above, in response to a digital certificate signing request from a customer, the certificate authority may select a network endpoint that is to be specific to the digital certificate. The network endpoint may furnish the CRL in response to requests to obtain the CRL and track these requests as usage of the digital certificate. If a network endpoint is used for tracking usage of a digital certificate, the certificate authority may issue 1114 the new digital certificate to the customer with the network address of the network endpoint. Thus, the network endpoint may continue monitoring usage of the digital certificate. In some instances, the certificate authority may select a new network endpoint for the new digital certificate as the certificate authority may allow the expiring digital certificate to be used. The network address of the new network endpoint may be specified in the new digital certificate issued to the customer. If a network endpoint is not used for monitoring of the digital certificate, the certificate authority may issue 1112 the new digital certificate to the customer without including a network address to a network endpoint.

Once the certificate authority has issued the new digital certificate to the customer, the certificate authority may monitor 1116 usage of the new digital certificate. For instance, the network endpoint selected to be specific to the new digital certificate may track requests to obtain the CRL as being indicative of usage of the digital certificate, which it may store in its local repository and provide to the certificate authority. Similarly, the certificate authority may track incoming OCSP requests to determine the revocation status of the new digital certificate as being indicative of usage of the new digital certificate, which the certificate authority may record within a database in the certificate monitoring data store. Monitoring of the new digital certificate may be performed in accordance with the customer's configuration information provided in the digital certificate signing request for the original digital certificate or using default settings of the certificate authority if the customer has not provided its configuration information.

Figure 12:
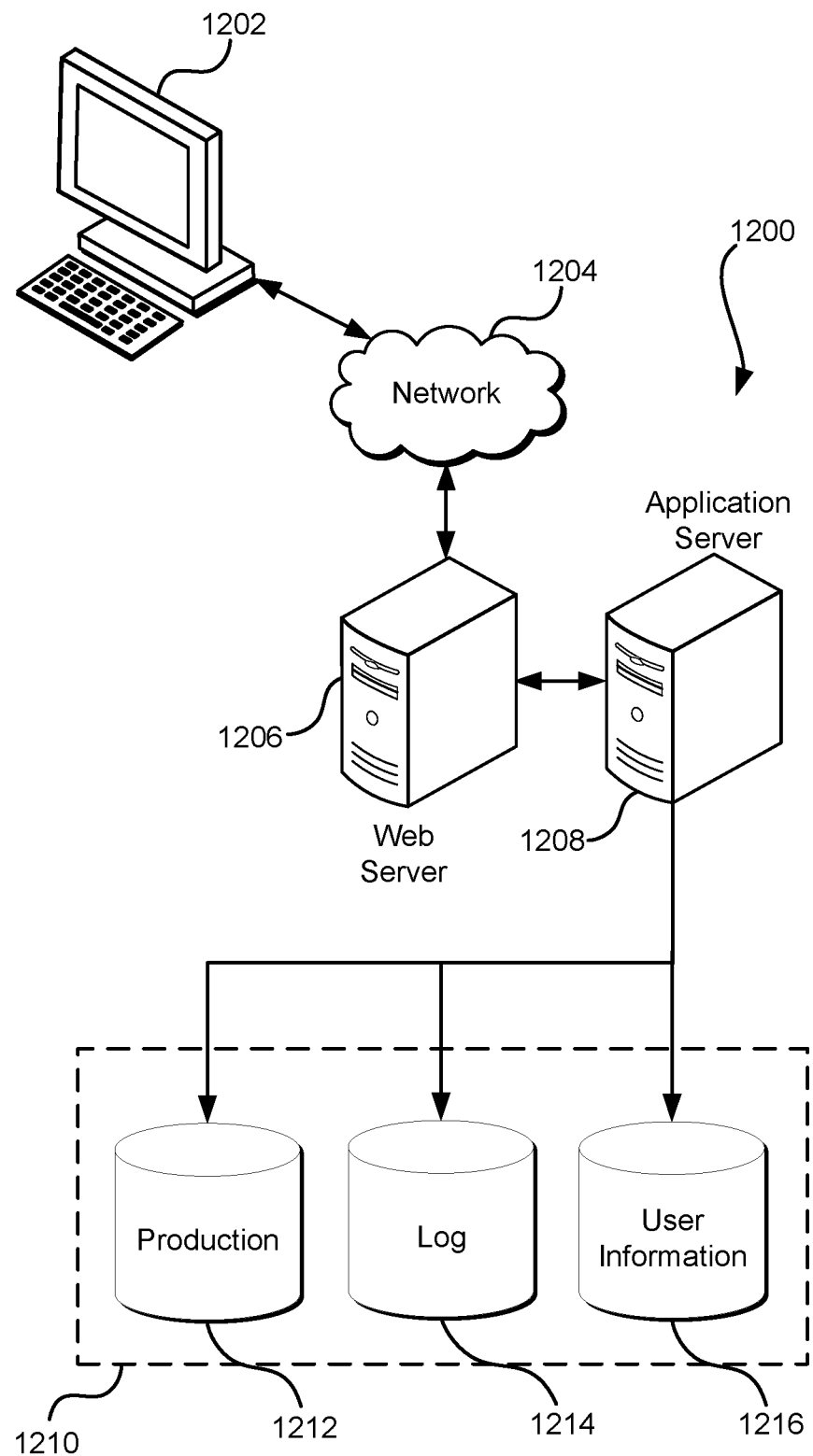
FIG. 12 shows an illustrative example of an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM,® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a service provider computing environment that provides a certificate authority and from a client device, a request to obtain a validity status of a digital certificate issued by the certificate authority, the validity status specifying a revocation status of the digital certificate and the request generated based at least in part on an online certificate status protocol;
   providing, to the client device, the validity status for determining validity of the digital certificate;

identifying a usage profile associated with the digital certificate, based at least in part on the request, the digital certificate, and an update to usage information for the digital certificate, the usage information generated based at least in part on previous requests to obtain the validity status of the digital certificate;

modifying the usage profile maintained in a data store based at least in part on the update to the usage information for the digital certificate; and causing, based at least in part on the usage profile and configuration information for monitoring usage of the digital certificate, the certificate authority to renew the digital certificate in accordance with the configuration information.

2. The computer-implemented method of claim 1, wherein:

the information for determining the validity status of the digital certificate is a certificate revocation list; and the method further comprises obtaining, in response to the request and from a logical data container, the certificate revocation list.

3. The computer-implemented method of claim 1, wherein the computer-implemented method further comprises transmitting usage information for the digital certificate to an address of an entity specified in the configuration information.

4. The computer-implemented method of claim 1, wherein the usage information includes at least one of: an interval of time at which the request was received, a network address of an entity that submitted the request, and an indication whether the request was fulfilled.

5. A system, comprising:

one or more processors; and memory including instructions that, as a result of being executed by the one or more processors in a service provider environment that provides a certificate authority, cause the system to:

receive a request to obtain information for determining a validity status of a digital certificate issued by the certificate authority, where the request is an online certificate status protocol request specifying an identifier of the digital certificate;

identify the digital certificate specified in the request and usage data for the digital certificate based at least in part on the request;

generate an update to based at least in part on the usage data;

provide the update to the usage information data store, the update causing the usage information data store to modify a usage profile; and generate an indication to the certificate authority based at least in part on the usage profile contained in the usage information data store, the indication indicating whether to renew the digital certificate prior to an expiration or allow the digital certificate to expire.

6. The system of claim 5, wherein:
the information for determining the validity status is a certificate revocation list; and
the instructions further cause the system to obtain the certificate revocation list from a cache to provide the information for determining the validity status.

7. The system of claim 5, wherein
the instructions further cause the system to:
utilize the identifier of the digital certificate to query a data store and obtain a revocation status for the digital certificate;

generate an online certificate status protocol response that specifies the revocation status; and
transmit the online certificate status protocol response to a requestor that submitted the request.

8. The system of claim 5, wherein the instructions further cause the system to, based at least in part on the indication, issue a new digital certificate to replace the digital certificate on a condition that the digital certificate is expiring and that the usage profile indicates that the digital certificate has been used at a frequency greater than a minimum threshold frequency.

9. The system of claim 5, wherein the instructions further cause the system to transmit the information contained in the usage information data store to an entity that was issued the digital certificate.

10. The system of claim 5, wherein the instructions further cause the system to, based at least in part on the indication, allow the digital certificate to expire without issuing a new digital certificate on a condition that the usage profile indicates that the digital certificate has been used at a lower frequency than a minimum threshold frequency.

11. The system of claim 5, wherein the instructions further cause the system to generate a histogram that demonstrates usage of the digital certificate over a validity period of the digital certificate based at least in part on the usage profile.

12. The system of claim 5, wherein the instructions that cause the system to generate the update to the usage information data store further cause the system to:

determine an origin of the request;
assign a weighted value to the request based at least in part on the origin of the request; and
include the weighted value in the update.

13. A non-transitory computer-readable storage medium storing thereon executable instructions that, as a result of being executed by one or more processors of a computer system, cause the computer system to at least:

make available validity information usable in determining a validity status of a digital certificate by at least transmitting an online certificate status protocol response that specifies a revocation status for the digital certificate;

receive a plurality of requests to obtain the validity information;

collect usage information for the digital certificate based at least in part on the plurality of requests, the usage information generated based at least in part on previous requests to obtain the validity status of the digital certificate;

modify the usage information based at least in part on a format specified in the one or more preferences;

generate, based at least in part on the usage information for the digital certificate indicating a pattern of use associated with the digital certificate, a determination to renew the digital certificate in accordance with one or more preferences specified by an entity to which the digital certificate was issued; and provide to a certificate authority a request indicating renewal of the digital certificate based at least in part on the determination.

14. The non-transitory computer-readable storage medium of claim 13, wherein the instructions that cause the computer system to make available the validity information for determining the validity status of the digital certificate further include executable instructions that, as a result of being executed by the one or more processors, cause the computer system to provide a certificate revocation list in response to at least one request of the plurality of requests.

15. The non-transitory computer-readable storage medium of claim 13, wherein the instructions that cause the computer system to make available the validity information for determining the validity status of the digital certificate further include executable instructions that, as a result of being executed by the one or more processors, cause the computer system to make available the validity information in response to an expiration date associated with the digital certificate.

16. The non-transitory computer-readable storage medium of claim 13, wherein the instructions that cause the computer system to collect the usage information for the digital certificate further include executable instructions that, as a result of being executed by the one or more processors, cause the computer system to weigh the usage information based at least in part on a set of identities associated with the plurality of requests.

17. The non-transitory computer-readable storage medium of claim 13, wherein the instructions that cause the computer system to provide to the certificate authority the request indicating renewal of the digital certificate further include executable instructions that, as a result of being executed by the one or more processors cause the computer system to request the certificate authority issue a new digital certificate to the entity to which the digital certificate was issued.

18. The non-transitory computer-readable storage medium of claim 13, wherein the executable instructions further cause the computer system to allow the digital certificate to expire and transmit a notification to the entity including the pattern of use associated with the digital certificate.

19. The non-transitory computer-readable storage medium of claim 13, wherein the executable instructions further cause the computer system to:
  determine that the digital certificate has been revoked; and
  generate, based at least in part on the usage information for the digital certificate, an alarm indicating that the digital certificate has been compromised.

20. The non-transitory computer-readable storage medium of claim 13, wherein the executable instructions further cause the computer system to:
  provide the usage information in the format to the entity.

\* \* \* \* \*